US012589552B2

(12) United States Patent
Joyner et al.

(10) Patent No.: US 12,589,552 B2
(45) Date of Patent: Mar. 31, 2026

(54) SYSTEMS AND METHODS FOR AUTOMATED POST PROCESSING OF 3D PRINTED OBJECTS

(71) Applicant: NOVASTAR SOLUTIONS INC., Livonia, MI (US)

(72) Inventors: Jeffrey Kendall Joyner, Birmingham, MI (US); David Alan Baumgarten, Commerce, MI (US)

(73) Assignee: NOVASTAR SOLUTIONS INC., Livonia, MI (US)

( * ) Notice: Subject to any disclaimer, the term of this patent is extended or adjusted under 35 U.S.C. 154(b) by 516 days.

(21) Appl. No.: 18/022,037

(22) PCT Filed: Aug. 11, 2021

(86) PCT No.: PCT/US2021/045484
§ 371 (c)(1),
(2) Date: Feb. 17, 2023

(87) PCT Pub. No.: WO2022/039986
PCT Pub. Date: Feb. 24, 2022

(65) Prior Publication Data
US 2023/0391009 A1       Dec. 7, 2023

Related U.S. Application Data

(60) Provisional application No. 63/067,771, filed on Aug. 19, 2020.

(51) Int. Cl.
*B29C 64/35*       (2017.01)
*A47L 7/00*        (2006.01)
(Continued)

(52) U.S. Cl.
CPC ............ *B29C 64/35* (2017.08); *A47L 7/0052* (2013.01); *B08B 5/04* (2013.01); *B08B 7/02* (2013.01);
(Continued)

(58) Field of Classification Search
None
See application file for complete search history.

(56) References Cited

U.S. PATENT DOCUMENTS

2015/0273527 A1* 10/2015 Kelly ..................... A23N 11/00
                                                               209/288
2017/0312885 A1   11/2017 Rhodes et al.
2020/0307078 A1* 10/2020 Kajita ...................... B08B 7/02

FOREIGN PATENT DOCUMENTS

CN       111391324 A     7/2020
EP       1577432 A2      9/2005
(Continued)

OTHER PUBLICATIONS

International Search Report and Written Opinion of the ISA issued in PCT/US2021/045484, mailed Dec. 1, 2021; ISA/KR.

*Primary Examiner* — Cristi J Tate-Sims

(57) ABSTRACT

A system includes a vertical frame portion, a horizontal frame portion connected to the vertical frame portion, a motor connected to the vertical frame portion above the horizontal frame portion and including a shaft extending outwardly from the vertical frame portion, and a container having first and second end surfaces, a meshed wall surface extending between the first and second end surfaces, and a lid located on one of the meshed wall surface, the first end surface, and the second end surface. At least one of the first and second end surfaces is removably connected to the shaft. The motor rotates the container relative to the vertical frame portion and the horizontal frame portion. The horizontal frame portion includes a tubular portion including a slit and
(Continued)

first and second panels sloping towards the slit to direct material falling from the meshed wall surface of the container towards the slit.

18 Claims, 21 Drawing Sheets

(51) Int. Cl.
　　*B08B 5/04*　　　　　(2006.01)
　　*B08B 7/02*　　　　　(2006.01)
　　*B08B 7/04*　　　　　(2006.01)
　　*B22F 10/68*　　　　(2021.01)
　　*B22F 10/73*　　　　(2021.01)
　　*B29C 64/357*　　　(2017.01)
　　*B33Y 40/20*　　　　(2020.01)

(52) U.S. Cl.
　　CPC ................ *B08B 7/04* (2013.01); *B22F 10/68*
　　　　　　　(2021.01); *B22F 10/73* (2021.01); *B29C*
　　　　　　*64/357* (2017.08); *B33Y 40/20* (2020.01);
　　　　　　　　　　　*B22F 2999/00* (2013.01)

(56)　　　　　　　References Cited

FOREIGN PATENT DOCUMENTS

WO　　WO-2014012883　A2　　1/2014
WO　　WO-2021211658　A1 *　10/2021　............. B08B 7/026

* cited by examiner

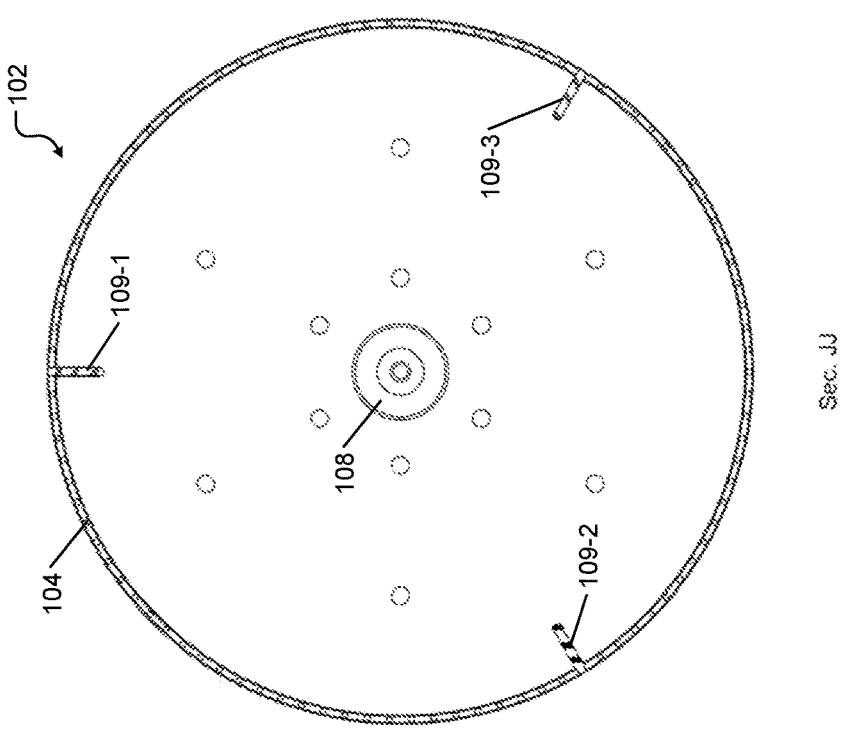
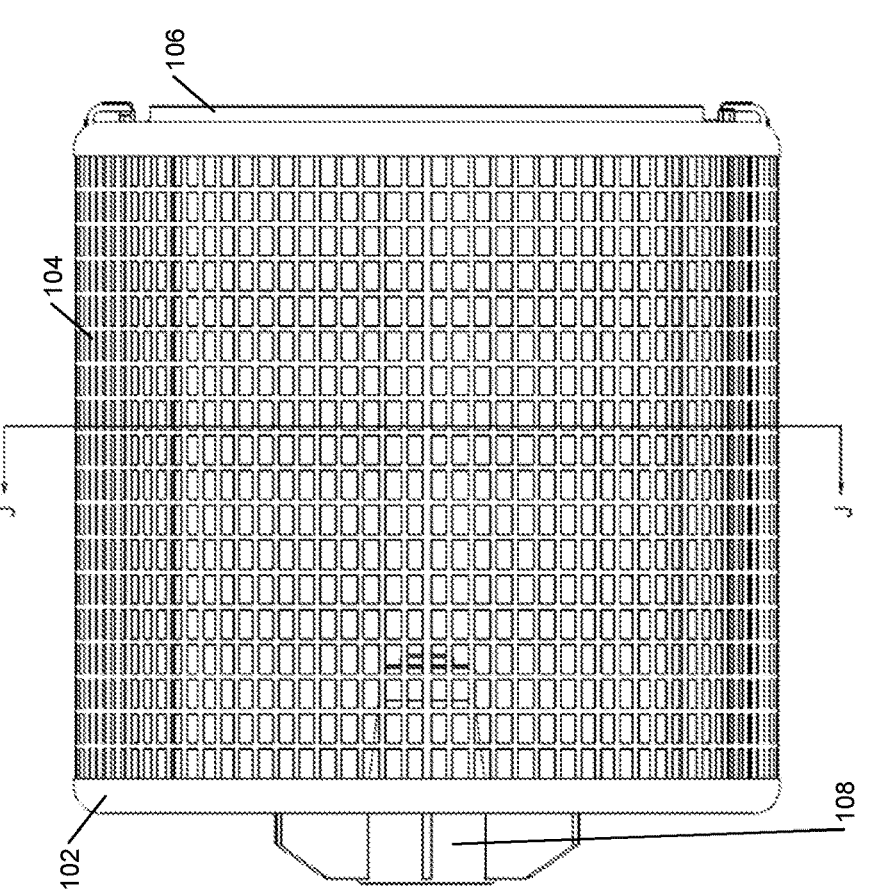
FIG. 2

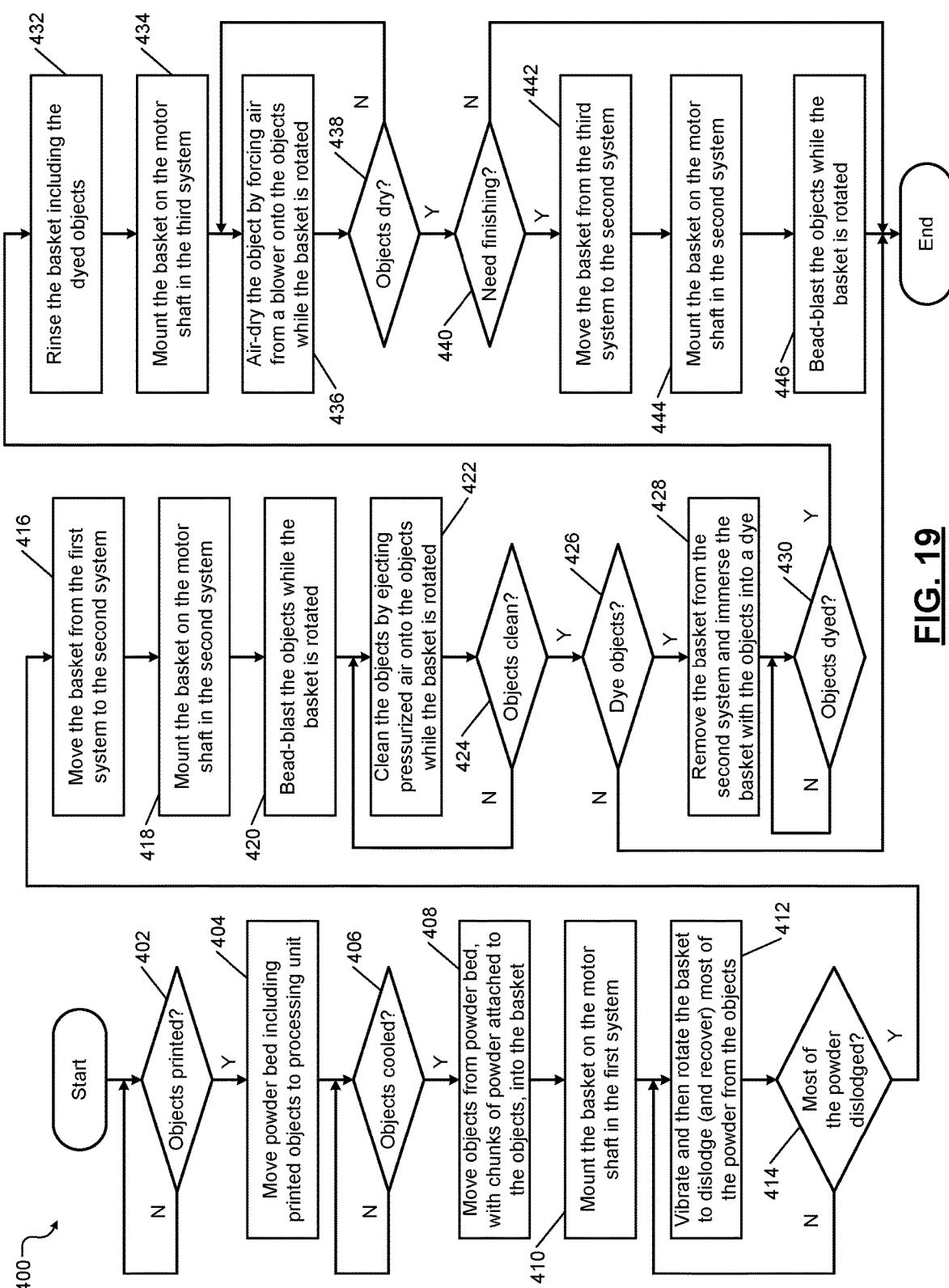

Start

402 Objects printed? N (loop back) / Y

404 Move powder bed including printed objects to processing unit

406 Objects cooled? N (loop back) / Y

408 Move objects from powder bed, with chunks of powder attached to the objects, into the basket 410 Mount the basket on the motor shaft in the first system 412 Vibrate and then rotate the basket to dislodge (and recover) most of the powder from the objects 414 Most of the powder dislodged? N (loop back) / Y 416 Move the basket from the first system to the second system 418 Mount the basket on the motor shaft in the second system 420 Bead-blast the objects while the basket is rotated 422 Clean the objects by ejecting pressurized air onto the objects while the basket is rotated 424 Objects clean? N (loop back) / Y 426 Dye objects? N / Y 428 Remove the basket from the second system and immerse the basket with the objects into a dye 430 Objects dyed? N (loop back) / Y 432 Rinse the basket including the dyed objects 434 Mount the basket on the motor shaft in the third system 436 Air-dry the object by forcing air from a blower onto the objects while the basket is rotated 438 Objects dry? N (loop back) / Y 440 Need finishing? N / Y 442 Move the basket from the third system to the second system 444 Mount the basket on the motor shaft in the second system 446 Bead-blast the objects while the basket is rotated End

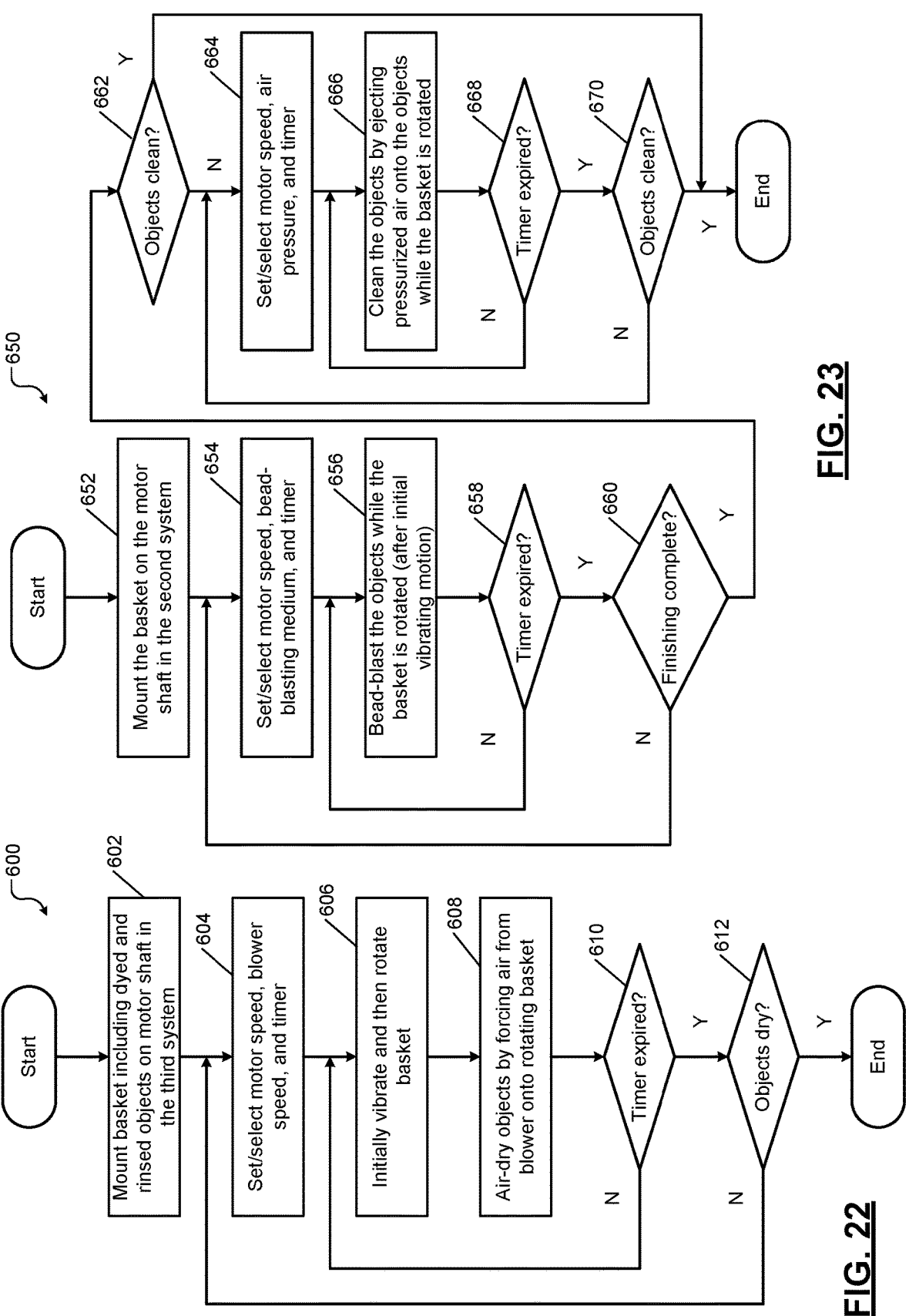

Start

Objects clean? — 662

Y → (to End)

N ↓

Set/select motor speed, air pressure, and timer — 664

↓

Clean the objects by ejecting pressurized air onto the objects while the basket is rotated — 666

↓

Timer expired? — 668

N (loop back)

Y ↓

Objects clean? — 670

N (loop back)

Y → End

End

---

Start

Mount the basket on the motor shaft in the second system — 652

↓

Set/select motor speed, bead-blasting medium, and timer — 654

↓

Bead-blast the objects while the basket is rotated (after initial vibrating motion) — 656

↓

Timer expired? — 658

N (loop back)

Y ↓

Finishing complete? — 660

N (loop back)

Start

Mount basket including dyed and rinsed objects on motor shaft in the third system — 602

↓

Set/select motor speed, blower speed, and timer — 604

↓

Initially vibrate and then rotate basket — 606

↓

Air-dry objects by forcing air from blower onto rotating basket — 608

↓

Timer expired? — 610

N (loop back)

Y ↓

Objects dry? — 612

N (loop back)

Y → End

End

1

SYSTEMS AND METHODS FOR AUTOMATED POST PROCESSING OF 3D PRINTED OBJECTS

CROSS-REFERENCE TO RELATED APPLICATIONS

This application is a U.S. National Phase Application under 35 U.S.C. 371 of International Application No. PCT/US2021/045484, filed on Aug. 11, 2021, which claims the benefit of U.S. Provisional Application No. 63/067,771, filed on Aug. 19, 2020. The entire disclosures of the applications referenced above are incorporated herein by reference.

FIELD

The present disclosure relates generally to 3D printing and more particularly to systems and methods for processing objects printed using 3D printers.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Three-dimensional (3D) printing, or additive manufacturing, involves building a 3D object from a CAD model or a digital 3D model. 3D printing can include a variety of processes in which material is deposited, joined, or solidified under computer control to create a 3D object with material being added together (such as liquid molecules or powder grains being fused together) typically layer-by-layer. Examples of the processes include Selective Laser Sintering (SLS), Selective Laser Melting (SLM), and Multi Jet Fusion (MJF). A brief overview of each of these processes follows.

Selective laser sintering (SLS) is an additive manufacturing (AM) technique that uses a laser as a power source to sinter powdered material (e.g., nylon or polyamide). A solid structure is created by aiming the laser automatically at points in space defined by a 3D model and by binding the material together. SLS uses a high-power laser to fuse small particles of plastic, metal, ceramic, or glass powders into a mass that has a desired 3D shape. The laser selectively fuses powdered material by scanning cross-sections generated from a 3D digital description (e.g., from a CAD file or scan data) of the part on the surface of a powder bed. After each cross-section is scanned, the powder bed is lowered by one layer thickness, a new layer of material is applied on top, and the process is repeated until the part is completed.

Selective laser melting (SLM), also known as direct metal laser melting (DMLM) or laser powder bed fusion (LPBF), is a rapid prototyping, 3D printing or additive manufacturing (AM) technique designed to use a high-power-density laser to melt and fuse metallic powders together. While SLM is considered a subcategory of selective laser sintering (SLS), the SLM process has the ability to fully melt the metallic material into a solid 3D part unlike SLS. In SLM, thin layers of atomized fine metal powder are evenly distributed using a coating mechanism onto a substrate plate, usually metal, that is fastened to an indexing table that moves in the vertical (Z) axis. The process is performed in an inert chamber. Once each layer is distributed, each 2D slice of the part geometry is fused by selectively melting the powder using a high-power laser beam. The laser beam is directed in the X and Y directions with two high-frequency scanning mirrors. The laser energy is sufficiently intense to permit full melting (welding) of the particles to form solid metal. The process is repeated layer-by-layer until the part is completed.

Multi Jet Fusion (MJF) is a powder-bed 3D printing process that bonds an agent and a powder in a process similar to binder jetting. Unlike point-by-point laser-based powder-bed fusion systems, MJF selectively distributes fusing and detailing agents across a bed of powder, and layers are fused together using infrared light. The MJF system includes exchangeable build units that can be wheeled between MJF 3D printers and separate post-processing stations for rapid cooling and powder removal. This modular system allows the 3D printer and the post-processing stations to run continuously while the build units cycle through, which speeds up part production.

In the MJF system, a print-head deposits droplets of fusing and detailing agents across layers of polymer powder in a preheated bed. The fusing agent serves as a heat-absorbing ink, making the powder it covers more prone to melting. Each layer is fused using infrared light to melt areas held by the fusing agent all at once. Meanwhile, the detailing agent provides a cooling effect, providing crisp edges around the melted area and preventing the melt-pool from bleeding into the loose powder. Powder is distributed on top of each solid layer, and the process repeats until the part is complete. The powder supports the part as it grows, which obviates the need for extra support structures, which in turn allows for greater design freedom and enables larger quantities of parts to be produced at once.

When the build finishes, the build unit (the entire powder bed with the suspended parts) is removed from the printer and placed into the post-processing unit for rapid cooling. After cooling, loose powder is manually removed by vacuum and recycled. After further processing, parts manufactured using MJF tend to have quality surface finishes, fine feature resolution, and more consistent mechanical properties relative to laser-based powder bed processes like SLS. Further, since heating takes place layer-by-layer with powder packed beneath the parts, warping occurs less with MJF than with SLS.

SUMMARY

A system comprises a vertical frame portion and a horizontal frame portion connected to the vertical frame portion. The system comprises a motor connected to the vertical frame portion above the horizontal frame portion. The motor includes a shaft extending outwardly from the vertical frame portion. The system comprises a container having first and second end surfaces, a meshed wall surface extending between the first and second end surfaces, and a lid located on one of the meshed wall surface, the first end surface, and the second end surface. At least one of the first and second end surfaces is removably connected to the shaft of the motor. The motor rotates the container relative to the vertical frame portion and the horizontal frame portion. The horizontal frame portion includes a tubular portion including a slit and first and second panels sloping towards the slit to direct material falling from the meshed wall surface of the container towards the slit.

In another feature, a length of the slit is greater than or equal to a length of the container.

In another feature, the first and second panels are attached to the tubular portion along a length of the tubular portion and extend upwards and outwardly from the tubular portion from either side of the slit, respectively.

In another feature, the container includes a 3D-printed container.

In another feature, the container is cylindrical.

In another feature, the container contains an object printed on a 3D printer with powder from a powder bed of the 3D printer attached to the object.

In another feature, a distance between upper ends of the first and second panels is greater than a perimeter of the container.

In another feature, the tubular portion is closed at a first end that is proximate to the vertical frame portion and open at a second end that is opposite to the first end.

In another feature, the system further comprises a suction system connected to the tubular portion.

In another feature, the system further comprises a controller configured to control the motor.

In another feature, the system further comprises a power supply to supply power to the motor.

In another feature, the system further comprises a suction system connected to the second end of the tubular portion.

In another feature, the system further comprises a power supply to supply power to the motor and the controller.

In another feature, the system further comprises a controller configured to initially oscillate the container, and to subsequently rotate the container.

In another feature, the container includes a plurality of baffles extending radially inward from the meshed wall surface.

In other features, first ends of the first and second panels are attached to the vertical frame portion, and the system further comprises a plate attached to the tubular portion and to second ends of the first and second panels.

In another feature, the first and second panels are rectangular.

In another feature, the first and second panels are curved.

In another feature, a processing system for processing an object printed on a 3D printer comprises the system.

In still other features, a system comprises a frame and a motor mounted to the frame. The motor includes a shaft. The system comprises a container having a first end surface, a second end surface, a meshed wall surface extending between the first end surface and the second end surface, and a lid located on one of the meshed wall surface, the first end surface, and the second end surface. At least one of the first and second end surfaces is connected to the shaft of the motor. The system comprises a nozzle assembly connected to the frame and including a nozzle to dispense at least one of an abrasive material and a pressurized gas onto the meshed wall surface while the motor rotates the container.

In another feature, the nozzle assembly causes the nozzle to reciprocate horizontally across the meshed wall surface of the container as the motor rotates the container.

In another feature, the nozzle assembly causes the nozzle to reciprocate vertically across the meshed wall surface of the container as the motor rotates the container.

In another feature, the nozzle assembly causes the nozzle to rotate along a circle or an ellipse across the meshed wall surface of the container as the motor rotates the container.

In another feature, the nozzle assembly causes the nozzle to rotate along an arc across the meshed wall surface of the container as the motor rotates the container, and the system further comprises a second motor to move the nozzle assembly bi-directionally parallel to an axis of rotation of the container while the nozzle rotates.

In another feature, the nozzle assembly varies a direction that the nozzle ejects the at least one of the abrasive material and the pressurized gas across the meshed wall surface of the container as the motor rotates the container.

In another feature, the container contains an object printed on a 3D printer with powder from a powder bed of the 3D printer attached to the object.

In another feature, the system further comprises a controller configured to control supply of the abrasive material through the nozzle while rotating the container and while moving the nozzle horizontally across the meshed wall surface of the container as the motor rotates the container.

In another feature, the system further comprises a controller configured to control supply of the pressurized gas through the nozzle while rotating the container and while moving the nozzle horizontally across the meshed wall surface of the container as the motor rotates the container.

In other features, the system further comprises a track attached to the frame, the track being parallel to an axis of rotation of the container, and a second motor attached to the frame to drive the nozzle assembly bidirectionally along the track. The nozzle is directed towards the container perpendicularly to the axis of rotation of the container.

In another feature, the system further comprises a controller configured to control the motor to rotate the container, and to control the second motor to move the nozzle assembly bidirectionally along the track while the container is rotated.

In another feature, the system further comprises a controller configured to control supply of the abrasive material through the nozzle while rotating the container and while moving the nozzle assembly bidirectionally along the track.

In another feature, the system further comprises a controller configured to control supply of the pressurized gas through the nozzle while rotating the container and while moving the nozzle assembly bidirectionally along the track.

In other features, the nozzle assembly comprises a second nozzle, and the system further comprises a controller configured to control supply of the abrasive material through the nozzle while rotating the container and while moving the nozzle assembly bidirectionally along the track, and to control supply of the pressurized gas through the second nozzle while rotating the container and while moving the nozzle assembly bidirectionally along the track.

In another feature, the controller is configured to operate the nozzle or the second nozzle while rotating the container and while moving the nozzle assembly bidirectionally along the track.

In another feature, the system further comprises a power supply to supply power to the motor and the second motor and the controller.

In another feature, the system further comprises a controller configured to control supply of the abrasive material through the nozzle while rotating the container and while the nozzle reciprocates horizontally across the meshed wall surface of the container.

In another feature, the system further comprises a controller configured to control supply of the pressurized gas through the nozzle while rotating the container and while the nozzle reciprocates horizontally across the meshed wall surface of the container.

In other features, the nozzle assembly comprises a second nozzle, and the system further comprises a controller configured to operate at least one of the nozzle and the second nozzle while rotating the container and while the nozzle assembly causes the nozzle to reciprocate horizontally across the meshed wall surface of the container.

In other features, the nozzle assembly comprises a second nozzle, and the system further comprises a controller configured to control supply of the abrasive material through the nozzle while rotating the container and while rotating the container and while the nozzle reciprocates horizontally across the meshed wall surface of the container, and to control supply of the pressurized gas through the second nozzle while rotating the container and while rotating the container and while the nozzle reciprocates horizontally across the meshed wall surface of the container.

In another feature, the controller is configured to operate at least one of the nozzle or the second nozzle while rotating the container and while the nozzle reciprocates horizontally across the meshed wall surface of the container.

In another feature, the system further comprises a power supply to supply power to the motor and the controller.

In another feature, the system further comprises a controller configured to supply through the nozzle the abrasive material including beads of first dimensions or second dimensions via respective valves.

In another feature, the system further comprises a source of the abrasive material connected to the nozzle via a valve.

In another feature, the system further comprises a source of the pressurized gas connected to the nozzle via a valve.

In other features, the nozzle assembly includes N nozzles, where N is an integer greater than or equal to 2; and at least two of the N nozzles direct the at least one of the abrasive material and the pressurized gas into the meshed wall surface from different directions.

In other features, the nozzle assembly includes N nozzles, where N is an integer greater than or equal to 2. A first set of the N nozzles direct the abrasive material into the meshed wall surface. A second set of the N nozzles directs the pressurized gas onto the meshed wall surface.

In another feature, the first and second sets of the N nozzles are on at the same time.

In another feature, the first and second sets of the N nozzles alternate being on.

In another feature, nozzles in the first set of the N nozzles have different incident angles.

In another feature, nozzles in the second set of the N nozzles have different incident angles.

In other features, the system further comprises an enclosure enclosing the system. The enclosure includes an opening with a door having a size greater than a perimeter of the container. The enclosure comprises an outlet connected to a suction system.

In other features, the system further comprises a mounting assembly coupled to the motor, a pair of rails coupled to the mounting assembly and mounted to the frame, and a rod with a first end connected to the mounting assembly and a second end connected to a handle through the frame. The mounting assembly slides on the pair of rails when the handle is moved.

In another feature, the container is removable.

In another feature, the container is cylindrical.

In another feature, the container includes a 3D-printed container.

In another feature, the system further comprises a controller configured to initially oscillate the container and to subsequently rotate the container.

In another feature, the container includes a plurality of baffles extending radially inward from the meshed wall surface.

In other features, the system further comprises a media supply system configured to supply at least one of the abrasive material, the pressurized gas, a dye, and a rinsing fluid at different pressures and temperatures. The system further comprises a plurality of valves connected to the media supply system and to the nozzle assembly. The system further comprises a controller configured to control the valves and to supply the at least one of the abrasive material, the pressurized gas, the dye, and the rinsing fluid to the nozzle while rotating the container.

In another feature, the system further comprises a blower to blow air onto the container while rotating the container.

In still other features, a method comprises placing an object, with a removable material attached to the object, in a container having a meshed wall; and coupling the container containing the object to a motor. The method comprises rotating the container using the motor to remove at least a portion of the removable material from the object.

In another feature, the method further comprises vibrating the container using the motor before rotating the container using the motor.

In another feature, the method further comprises printing the container on a 3D printer.

In other features, the object is printed on a 3D printer from a powder bed of the 3D printer, and the removable material attached to the object includes powder from the powder bed.

In other features, the method further comprises collecting the powder removed from the object, and reusing the collected powder for printing objects on the 3D printer.

In other features, the method further comprises ejecting a medium including beads from a nozzle onto the object, and moving the nozzle bidirectionally along an axis of rotation of the container using a second motor while ejecting the medium from the nozzle onto the object and while rotating the container containing the object.

In other features, the method further comprises ceasing ejecting the medium from the nozzle, ejecting pressurized air from the nozzle onto the object, and moving the nozzle bidirectionally along the axis of rotation of the container using the second motor while ejecting the medium from the nozzle onto the object and while rotating the container containing the object.

In other features, the method further comprises ceasing ejecting the medium from the nozzle, ejecting pressurized air from a second nozzle onto the object, moving the second nozzle bidirectionally along the axis of rotation of the container using the second motor while ejecting the pressurized air from the second nozzle onto the object and while rotating the container containing the object, and ceasing ejecting the pressurized air from the second nozzle.

In other features, the method further comprises causing a nozzle to reciprocate horizontally across the meshed wall of the container while rotating the container, and ejecting a material from the nozzle onto the container.

In other features, the method further comprises causing a nozzle to reciprocate vertically across the meshed wall of the container while rotating the container, and ejecting a material from the nozzle onto the container.

In other features, the method further comprises rotating a nozzle along a circle or an ellipse across the meshed wall of the container while rotating the container, and ejecting a material from the nozzle onto the container.

In other features, the method further comprises rotating a nozzle along an arc across the meshed wall of the container while rotating the container, moving the nozzle bi-directionally parallel to an axis of rotation of the container while the nozzle rotates, and ejecting a material from the nozzle onto the container.

In another feature, the method further comprises varying a direction a nozzle while the nozzle ejects a material across the meshed wall of the container while rotating the container.

In another feature, the method further comprises providing at least one of a rotational and a linear motion to one or more nozzles.

In another feature, the method further comprises spraying the object with at least one of an abrasive material and a pressurized gas using the one or more nozzles while rotating the container.

In another feature, the method further comprises spraying the object with a dye using the one or more nozzles while rotating the container.

In another feature, the method further comprises spraying the object with a rinsing liquid using the one or more nozzles while rotating the container.

In another feature, the method further comprises spraying the object with the pressurized gas using the one or more nozzles while rotating the container.

In another feature, the method further comprises controlling temperature of at least one of the dye, the rinsing liquid, and the pressurized gas.

Further areas of applicability of the present disclosure will become apparent from the detailed description, the claims and the drawings. The detailed description and specific examples are intended for purposes of illustration only and are not intended to limit the scope of the disclosure. One or more of the above features can be combined to the extent the combination is reasonably feasible in view of the drawings and the following detailed description.

BRIEF DESCRIPTION OF THE DRAWINGS

The present disclosure will become more fully understood from the detailed description and the accompanying drawings, wherein:

FIG. 2 shows a side isometric view and a cross-section of a basket used with the first system according to the present disclosure;

FIG. 19 shows a flowchart of a method for processing objects printed on a 3D printer according to the present disclosure;

FIG. 22 shows a method for dying and drying 3D printed objects according to the present disclosure; and FIG. 23 shows a method for providing a finish to 3D printed objects according to the present disclosure.

In the drawings, reference numbers may be reused to identify similar and/or identical elements.

DETAILED DESCRIPTION

Figure 1:
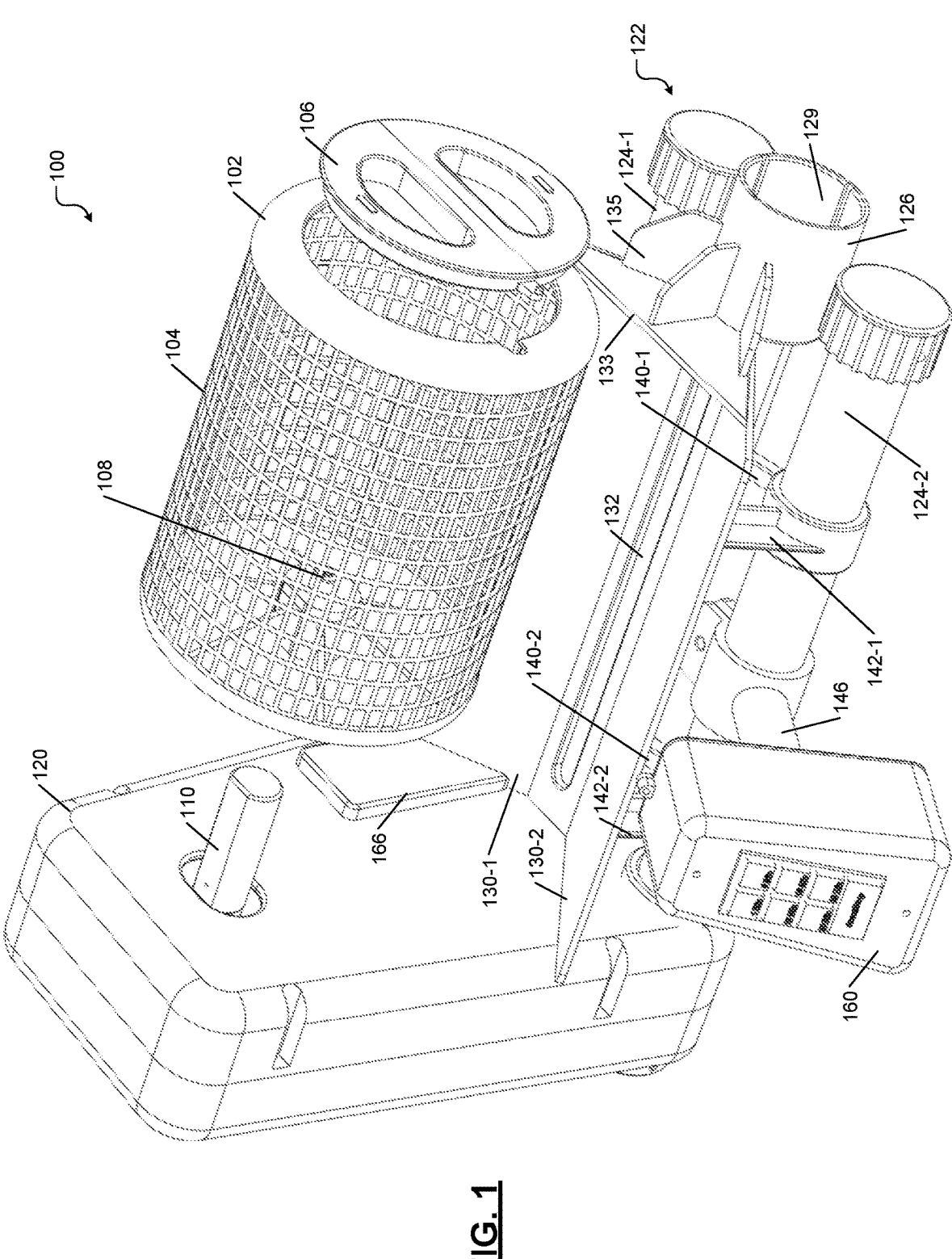
FIG. 1 shows a perspective view of an example of a first system for processing objects printed on a 3D printer according to the present disclosure.

After objects are printed in a powder bed using a 3D printer, the objects are covered with, or remain immersed in, unused powder in the powder bed. Typically, the powder bed including the printed objects is removed to a processing unit for post-processing. In the processing unit, the objects are allowed to cool in the powder bed. Thereafter, some of the powder is manually removed using a suction mechanism (e.g., a vacuum unit) in the processing unit. The removed powder can be recycled and reused for printing other objects.

Some amount of powder remains stuck to the printed objects after the post-processing. Removing the remaining powder from these objects is very laborious and time consuming. The amount of labor and time taken to remove the remaining powder is particularly significant when the objects are relatively small in size and large in quantity. The powder removal process typically includes removing the objects from the processing unit to an enclosure equipped with bead-blasting and suction mechanisms, in which each object is manually bead-blasted using a jet of fine glass beads. Often the process is repeated on many of the objects. Yet a small amount of powder remains stuck to surfaces and crevices of some of the objects, which is then removed using pressurized air, which further adds to the cleanup labor and time.

Subsequently, some of the objects may be immersed in a dye for providing an optional color finish to the surface of the objects. Afterwards, the dyed objects are rinsed and removed to another station to dry. All of the above processing can take several hours or days.

The present disclosure provides systems and methods that can automate and accelerate the post-processing of the printed objects that can significantly reduce the post-processing labor and time and enhance the finish of the objects. For example, the systems and methods can eliminate about 80% or more of the post-processing labor and time after the objects are printed and cooled.

The present disclosure provides three systems for post-processing of the 3D printed objects. A first system includes a cage-like meshed basket in which the printed objects are placed after the objects cool down in the processing unit, with chunks of the powder still attached to the objects. The basket is rotated (tumbled) as described below to dislodge most of the powder from the objects.

A second system includes a first mechanism including a motor to rotate the basket and a second bead-blasting mechanism arranged proximate to the rotating basket. The second mechanism includes a head with two nozzles: a first nozzle ejects fine glass beads at the objects tumbling in the basket, and a second nozzle subsequently ejects pressurized air at the objects tumbling in the basket. The head oscillates parallel to the axis of rotation of the basket while the material is ejected from either nozzle.

After processing the objects in the first system, where most of the powder is dislodged from the objects, the basket including the objects is removed and mounted on the shaft of the motor in the second system. While the basket rotates, the glass beads ejected from the oscillating first nozzle remove almost all of the residual powder from the objects. Subsequently, while the basket rotates, pressurized air ejected from the oscillating second nozzles clears any remaining powder stuck to the surfaces and crevices of the objects.

Thereafter, the basket including the cleaned objects is removed from the second system and optionally immersed in a dye bath. After dying is complete, the basket including the dyed objects is rinsed and removed to a station where the objects are air-dried using forced air. For example, the basket including the dyed and rinsed objects is installed in a third system that similar to the first system. In the third system, the basket including the dyed and rinsed objects is mounted on a shaft of a motor. The third system additionally includes a blower to air-dry the objects in the basket while the basket rotates. The third system additionally includes a drip pan to collect any residual dye that may drip from the objects while the basket rotates.

After drying, the basket including the dyed and dried objects can be optionally returned to the second system where the objects are again bead-blasted to provide a finish to the objects. The bead-blasting medium used for providing the finish can be different than the bead-blasting medium used earlier to remove residual powder from the objects before the objects are dyed. The finished objects are now ready for use.

Notably, after the objects from the powder bed are placed in the basket, the objects are not manually handled until the objects are ready to use, which significantly reduces labor and time compared to the conventional cleaning process. In addition to reducing labor and processing time, the automated processing of the objects by the first and second systems also reduces exposure to the powder, glass beads, pressurized air, dye, and so on.

Further, the basket itself can be manufactured using 3D printing. Since the basket can be printed on a 3D printer, the shape and size of the basket, including the size and shape of the holes in the mesh that forms the wall of the basket, can be customized depending on the size and shape of the object or objects to be processed using the basket. Further, the motor used to rotate the basket in each system can be selected to provide sufficient torque based on the size of the basket and the weight of the objects rotated in the basket. Accordingly, the systems and methods of the present disclosure are scalable. These and other features of the systems and methods are described below in detail.

The present disclosure is organized as follows. The first system for removing chunks of powder from the 3D printed objects is described with reference to FIGS. 1-6. The second system for removing residual powder from the 3D printed objects is described with reference to FIGS. 7-17. The third system for drying dyed and rinsed 3D printed objects is described with reference to FIG. 18. The various methods performed using the first, second, and third systems are described with reference to FIGS. 19-23.

Figure 3:
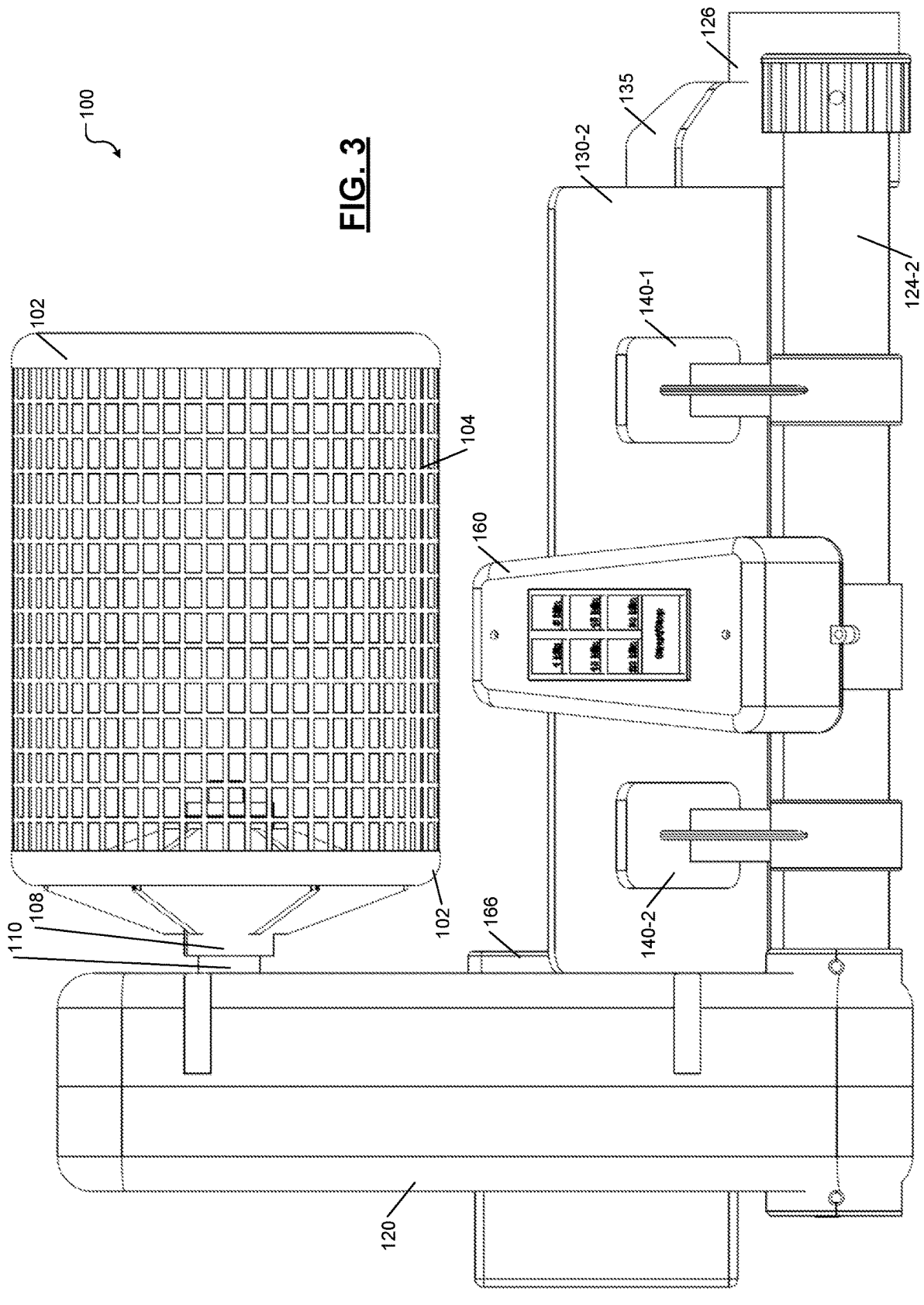
FIG. 3 shows a side isometric view of the first system according to the present disclosure.
Figure 4:
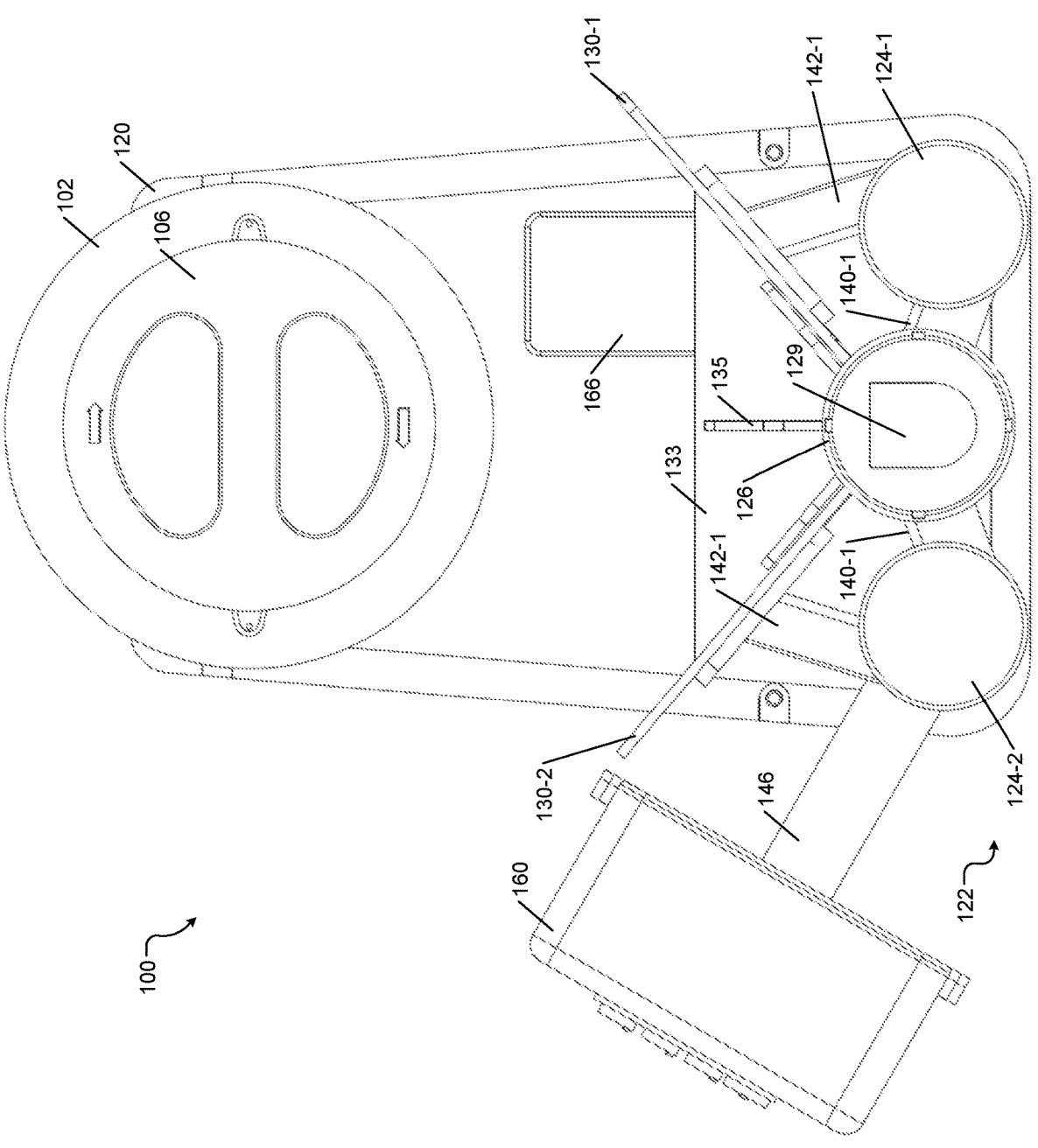
FIG. 4 shows a front isometric view of the first system according to the present disclosure.
Figure 5:
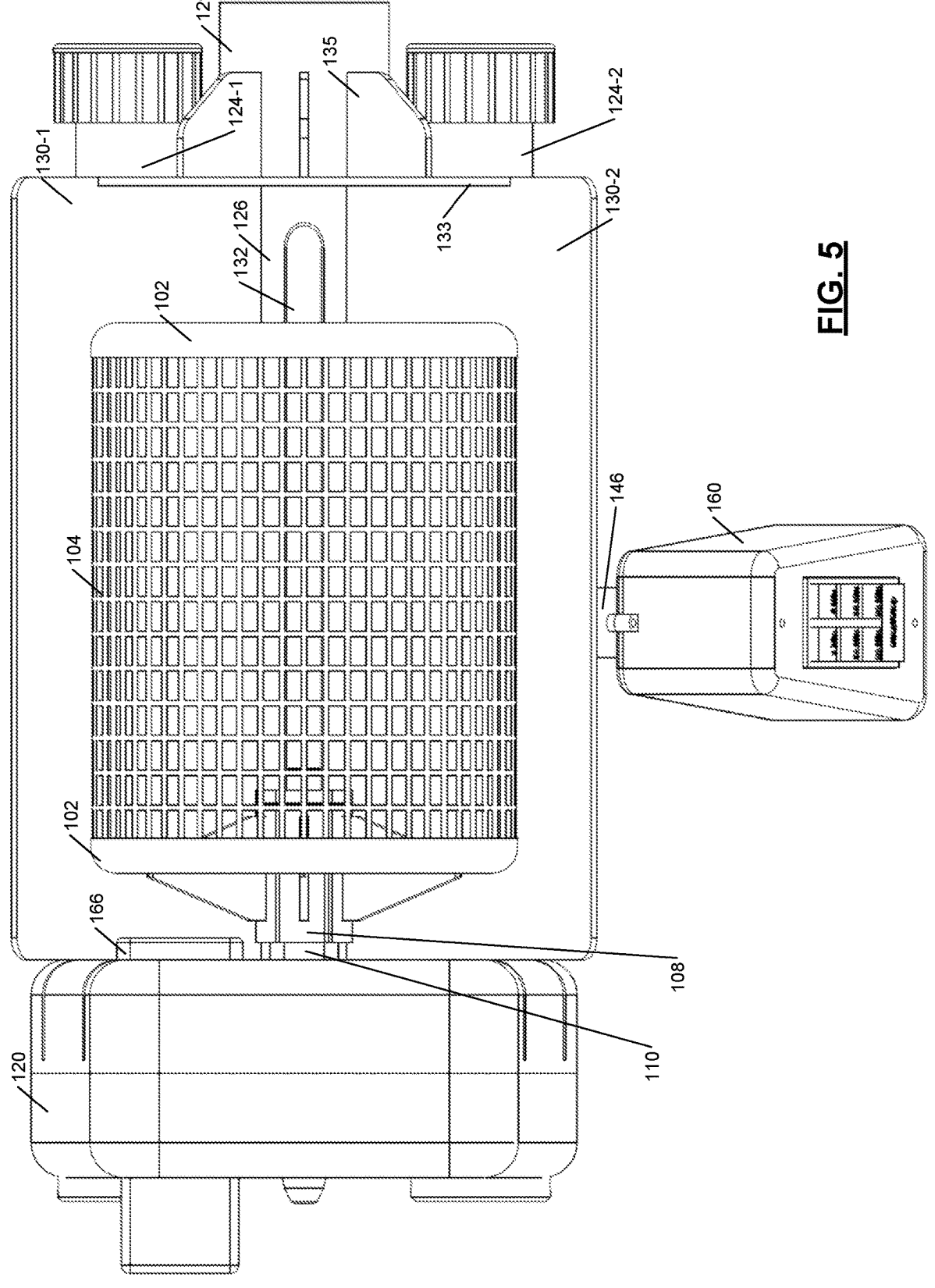
FIG. 5 shows a top view of the first system according to the present disclosure.
Figure 6:
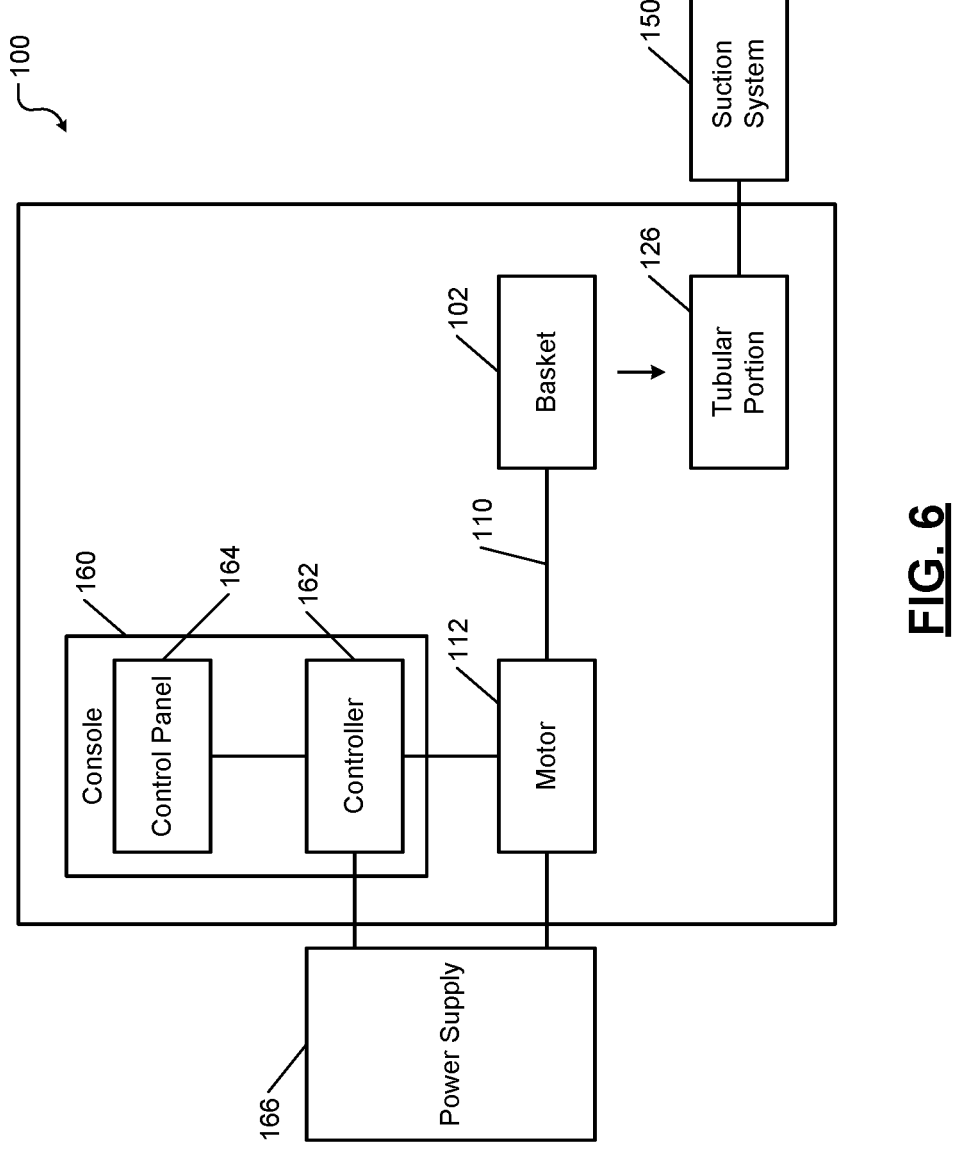
FIG. 6 shows a simplified block diagram of the first system according to the present disclosure.

FIGS. 1-6 show an example of a first system 100 according to the present disclosure. FIGS. 1 and 2 show a perspective view of the first system 100 and different views of basket used with the first system 100. FIG. 3 shows a side isometric view of the first system 100. FIG. 4 shows a front isometric view of the first system 100. FIG. 5 shows a top view of the first system 100. FIG. 6 shows a simplified block diagram of the first system 100 along with additional elements of the first system 100 described below. The first system 100 is described below by collectively referring to FIGS. 1-6.

The first system 100 comprises a basket 102. The basket 102 is a hollow, generally cylindrical, drum-shaped structure, also called a bin or a cage, or more generally a container with a meshed wall 104. While the basket 102 is shown and described as being cylindrical throughout the present disclosure, the basket 102 can be of any other shape. Alternatively, a cross-sectional shape of the basket 102 can include a hexagon, a square, a rectangle, and so on. The basket 102 can also have an irregular shape.

The basket 102 includes a lid 106 on a first end that can be opened and closed to place printed objects from a powder bed of a 3D printer into the basket 102. The lid 106 can be rotated to open and close the lid as shown. Alternatively, while not shown, the lid can be attached to the first end of the basket 102 by a hinge and can be opened and closed by swinging the lid up and down. In another alternate arrangement, the lid can be coupled to the first end of the basket 102 such that the lid can be opened and closed by rotating the lid circularly in opposite directions along a plane perpendicular to the length of the basket 102. In yet another alternate arrangement, the lid can be located anywhere on the basket 102. In any of these arrangements, the lid can be closed and latched to a sidewall of the basket 102 to secure the objects in the basket 102. The basket 102 is closed on a second end that is opposite to the first end (having the lid 106) and includes opening or slot 108 located centrally on the second end to mount the basket 102 on a shaft 110 of a motor 112. Accordingly, in general, the basket 102 can be a container having first and second end surfaces, a meshed wall surface extending between the end surfaces, and a lid located on at least one of the meshed wall and the first and second end surfaces.

As shown in FIG. 2, the basket 102 includes a plurality of vanes or baffles (or other similar structures) 109-1, 109-2, 109-3 (collectively baffles 109) that help tumble the objects in the basket when the basket 102 is rotated by the motor 112. While three baffles 109 are shown for example only, any number (e.g., a plurality) of baffles 109 can be used. The baffles 109 extend radially inward from the inside of the meshed wall 104 of the basket 102. The baffles 109 may partially or fully extend along the length (i.e., height along the axis of rotation) of the basket 102. Some of the baffles 109 may extend partially from the first end of the basket 102 while others may extend partially from the second end of the basket 102. In other words, the baffles 109 may be arranged in a staggered manner.

The first system 100 comprises a vertical frame portion (hereinafter vertical portion) 120 and a horizontal frame portion (hereinafter base portion) 122 that extends perpendicularly from a bottom end of the vertical portion 120. The motor 112 is mounted to (e.g., disposed in) the vertical portion 120 near a top end of the vertical portion 120. The shaft 110 of the motor 112 extends from the motor 112 horizontally along (i.e., parallel to) the base portion 122. The basket 102 can be removably mounted on the shaft 110 of the motor 112 by inserting the shaft 110 into the slot 108 on the second end of the basket 102.

The base portion 122 comprises two support members 124-1 and 124-2 (collectively support members 124), a tubular portion 126, two panels 130-1 and 130-2 (collectively panels 130), and an end plate 133. The support members 124 extend perpendicularly from the bottom end of the vertical portion 120. The support members 124 provide mechanical support and stability to the vertical portion 120 and generally to the entire first system 100. In other words, the first system 100 rests firmly on the support members 124.

While only two support members 124 are shown, the first system 100 can comprise additional support members. Further, while the support members 124 are shown and described as being cylindrical throughout the present disclosure, the support members 124 can be of any other shape. Alternatively, a cross-sectional shape of the support members 124 can include a hexagon, a square, a rectangle, and so on. The support members 124 can be hollow or solid.

The tubular portion 126 is disposed between the support members 124 and extends from the junction of the vertical and base portions 120, 122 along the length of the base portion 122 perpendicularly to the vertical portion 120. A first end of the tubular portion 126 is attached to the bottom end of the vertical portion 120. A second (distal) end of the tubular portion 126 includes an opening 129.

The tubular portion 126 is hollow and includes a slit 132 on an upward facing surface of the tubular portion 126. The slit 132 extends along most of the length of the tubular portion 126 between the first and second ends of the tubular portion 126. The length of the slit 132 can be greater than or equal to the length of the basket 102 (i.e., the dimension of the basket 102 along the axis of rotation of the basket 102). In some examples, the length of the slit 132 can be less than the length of the basket 102. One or more coupling members 140-1, 140-2 (collectively coupling members 140) are disposed between the tubular portion 126 and each of the support members 124 to provide support to the tubular portion 126.

While the tubular portion 126 is shown and described as being cylindrical throughout the present disclosure, the tubular portion 126 can be of any other shape. Alternatively, a cross-sectional shape of the tubular portion 126 can include a hexagon, a square, a rectangle, and so on.

In some embodiments, the first end of the tubular portion 126 may not be attached to the vertical portion 120. Instead, the first end of the tubular portion 126 may be detached from the vertical portion 120 and may be closed. The tubular portion 126 may be sufficiently supported by the coupling members 140 connected between the tubular portion 126 and the support members 124, and additional support from the vertical portion 120 may be unnecessary.

In some embodiments, while not shown, an additional support may be provided to the first end of the basket 102 when the second end of the basket 102 is mounted on the shaft 110 as follows. For example, a second vertical portion may extend vertically upwards from the distal end of the tubular portion 126 (e.g., from above the opening 129). The second vertical portion may be parallel to the vertical portion 120 and may be able to swivel or bend slightly relative to the vertical axis. At a distal (i.e., top) end of the second vertical portion, a second, non-rotating shaft can be provided. The second shaft can extend parallel to the base portion 122 and can be aligned with the shaft 110 of the motor 112. The lid 106 (or the first end of the basket 102) can include a second slot similar to the slot 108 that can be inserted into the second shaft. When the second end of the basket 102 is mounted on the shaft 110 of the motor 112, the second vertical portion can be slightly swiveled to insert the second shaft into the second slot of the basket 102. Accordingly, the basket 102 is supported on both ends. This can help secure the basket 102 when the basket 102 includes relatively heavier objects and/or when the objects in the basket 102 tend to accumulate towards the first end of the basket 102 when the basket 102 is rotated.

The panels 130 extend lengthwise from the junction of the vertical and base portions 120, 122 along the length of the base portion 122 perpendicularly to the vertical portion 120. Each of the panels 130 is mounted to the base portion 122 (e.g., to a respective one of the support members 124). Each of the panels 130 extends upwards outwardly from the base portion 122 at an acute angle relative to the base portion 122. Upper ends of the panels 130 extend beyond a perimeter of the basket 102. In other words, a distance between the upper ends of the first and second panels 130 is greater than the perimeter of the basket 102. Lower ends of the panels 130 are separated by a distance from each other and from the slit 132 and are attached to the tubular portion 126 on either side of the slit 132 on the tubular portion 126.

The panels 130 form a "V" shape and converge at the slit 132 to direct powder into the tubular portion 126. First ends of the panels 130 are joined to the vertical portion 120 to eliminate spillage and loss of powder falling from the basket 102 at the motor end. The end plate 133 is attached to second ends of the panels 130 (i.e., the ends away from the motor 112 and near the opening 129 of the tubular portion 126) to eliminate spillage and loss of powder falling from the basket 102. The end plate 133 is attached to the tubular portion 126 near the opening 129 and is supported by one or more support members 135 attached to the tubular portion 126 above the opening 129. The end plate 133 may be removable to facilitate removal and installation of the basket 102 in the shaft 110. The end plate 133 can be removed and installed before and after installing the basket 102 on the shaft 110, respectively.

While the panels 130 are shown as being rectangular throughout the present disclosure, the panels 130 can have any shape. For example, the panels 130 can be flat (i.e., rectangular) as shown or curved (e.g., concave). In general, the panels 130 can be of any shape and size suitable for collecting the powder released from the objects in the basket 102 when the basket 102 is rotated above the panels 130. The end plate 133 can have a suitable shape corresponding to the shape of the panels 130.

One or more coupling members 142-1, 142-2 (collectively coupling members 142) extend from each of the support members 124 and are attached to the panels 130 to provide support to the panels 130. The coupling members 142 can be omitted in some embodiments, and the attachment of the panels to the tubular portion 126 can provide sufficient support for the panels 130.

In use, printed objects are removed from a powder bed of a 3D printer after cooling with chunks of powder still attached to the objects and are placed in the basket 102. The basket 102 including the objects is mounted on the shaft 110 of the motor 112. Initially, before rotating the basket 102, the motor 112 vibrates the basket 102 by rapidly oscillating (i.e., rotating bi-directionally) the shaft 110 through a small angle. These rapid, short oscillations can help untangle the objects and can facilitate the cleaning (e.g., dislodging the attached powder) of the objects in the basket 102.

Subsequently, when the motor 112 rotates the basket 102 including the printed objects, the powder attached to the objects is dislodged from the objects and falls on the panels 130 and slides through the slit 132 into an inner volume (i.e., the hollow region) of the tubular portion 126. A suction mechanism 150 (e.g., a hose of a vacuum system, shown in FIG. 6) can be attached to the opening 129 on the second end of the tubular portion 126 to remove the powder from the tubular portion 126, which can be recycled and reused for printing other objects on the 3D printer.

A console 160 including a controller 162 (shown in FIG. 6) is attached to one of the support members 124 by a coupling member 146. Alternatively, the console 160 can be attached to the vertical portion 120. The console 160 includes a control panel 164 (including an input device such as a keypad, push buttons, or switches) connected to the controller 162 to enter control parameters for the first system 100. Non-limiting examples of the control parameters include an amount of time for which the motor 112 rotates the basket 102, the rotational speed at which the motor 112 rotates the basket 102, and so on. The input device can be used to change the speed of the motor 112. For example, the motor speed can be less for larger objects than for smaller objects. The console 160 can also include an output device (e.g., a display on the control panel 164) connected to the controller 162 to indicate time remaining once the rotating process begins.

In some embodiments, the base portion 122 may not include a plurality of support members 124. Instead, the base portion 122 may include a single support member extending perpendicularly from the bottom end of the vertical portion 120. For example, the single support member (i.e., the base portion 122) may be in form of a flat base or a platform. The tubular portion 126, the panels 130, and the console 160 may be attached to the single support member.

In some embodiments, the base portion 122 can be a portion of another equipment, apparatus, or system, such as a processing unit used with 3D printers, or any other machine used in an application where the first system 100 can be used. Accordingly, the first system 100 can be used as a standalone system or can be integrated into another machine.

The first system 100 further comprises a power supply 166 to supply power to the motor 112 and the console 160. The power supply 166 may be remote from the first system 100 and can be removably attached to the first system 100. Alternatively, the power supply 166 can be integrated into the first system 100 as shown in FIGS. 1-5.

In some examples, the first system 100 can be coupled to the processing unit used with 3D printers. When coupled to the processing unit used with a 3D printer, the vacuum system of the processing unit can be used with the first system 100. Further, optionally, the processing unit can supply power to the first system 100. Furthermore, the console 160 or a portion thereof can be at least partially or fully integrated with a controller of the processing unit.

Figure 7:
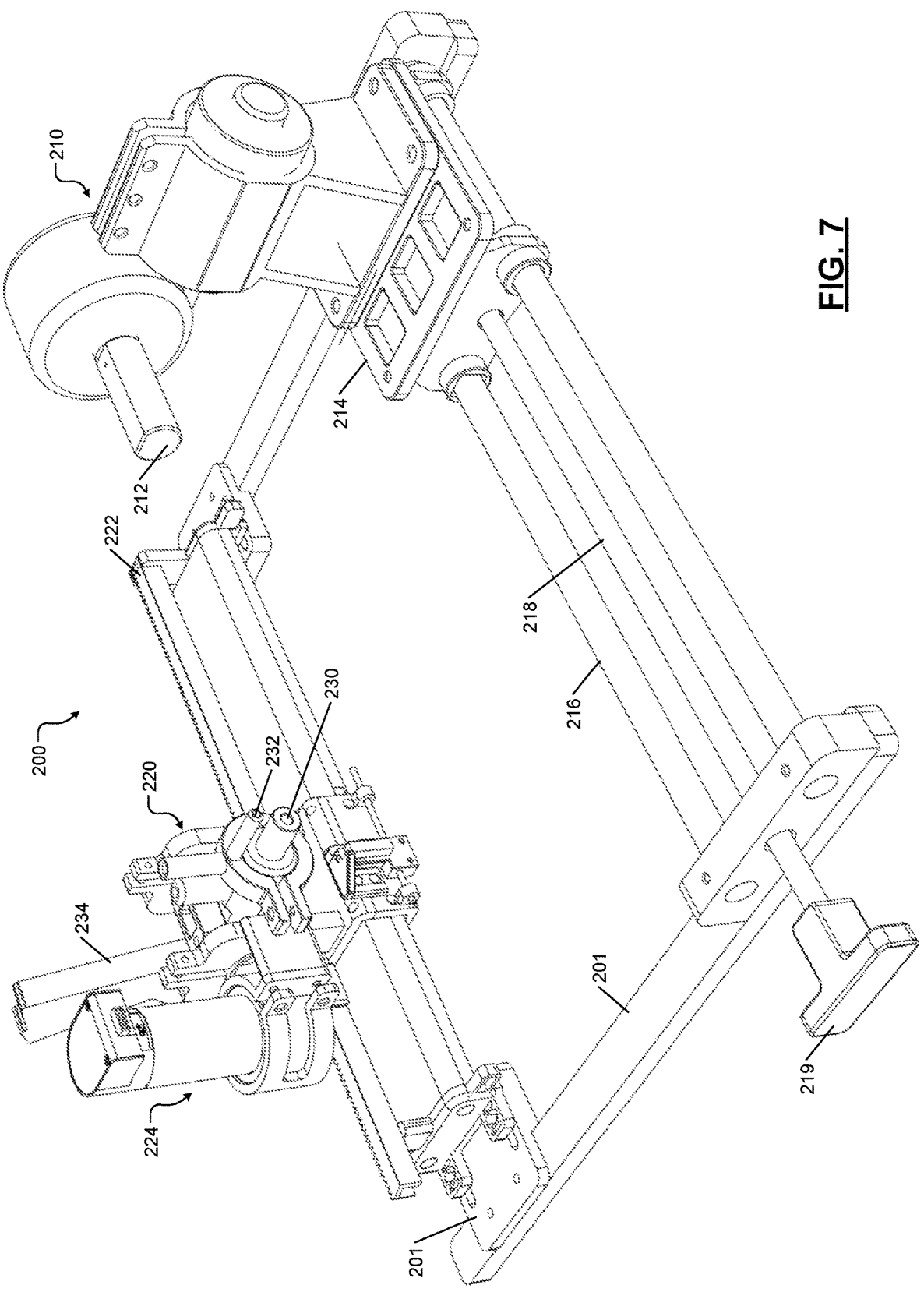
FIG. 7 shows a perspective view of an example of a second system for processing objects printed on a 3D printer (without the basket) according to the present disclosure.
Figure 8:
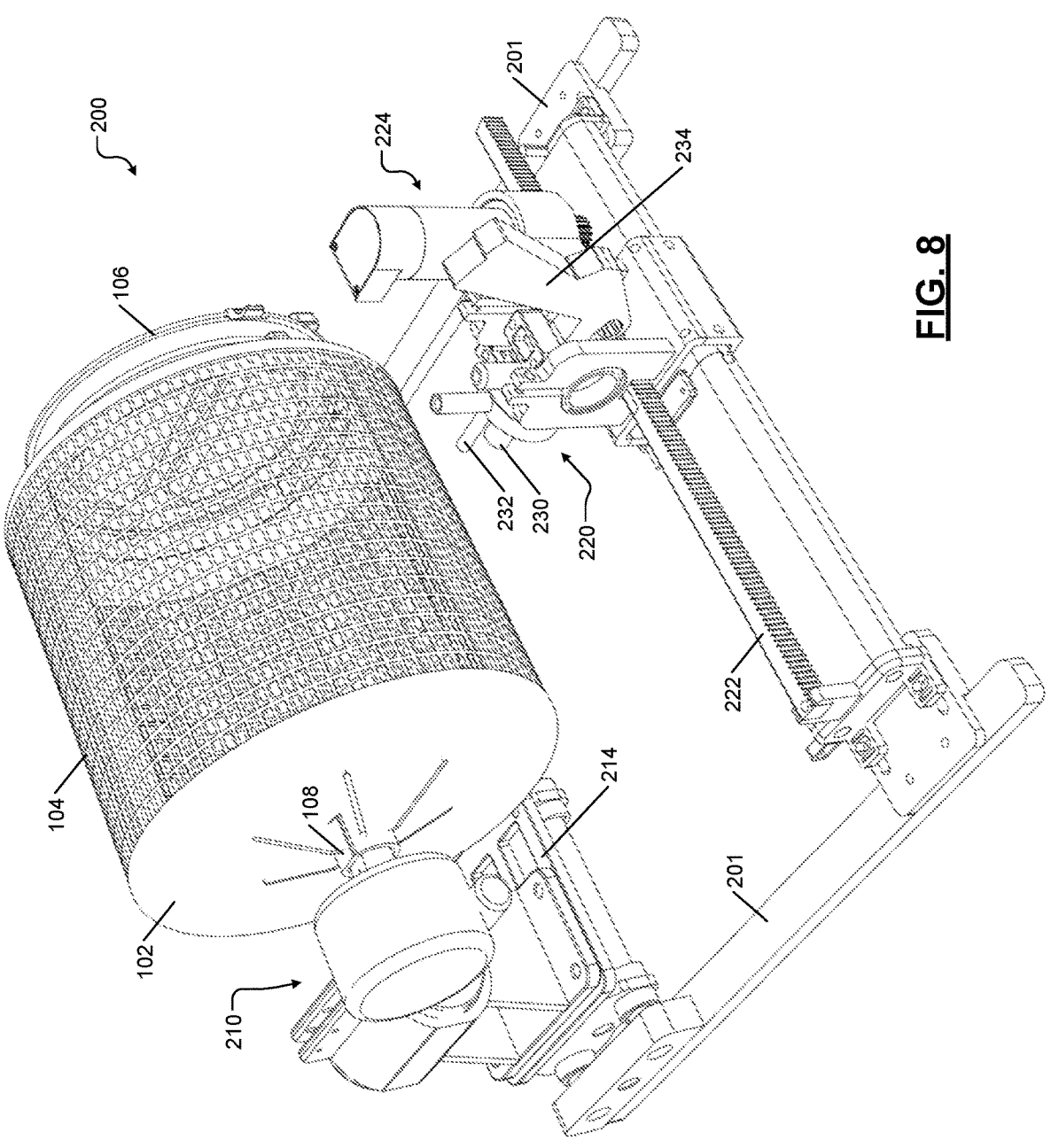
FIG. 8 shows another perspective view of the second system with the basket according to the present disclosure.
Figure 9:
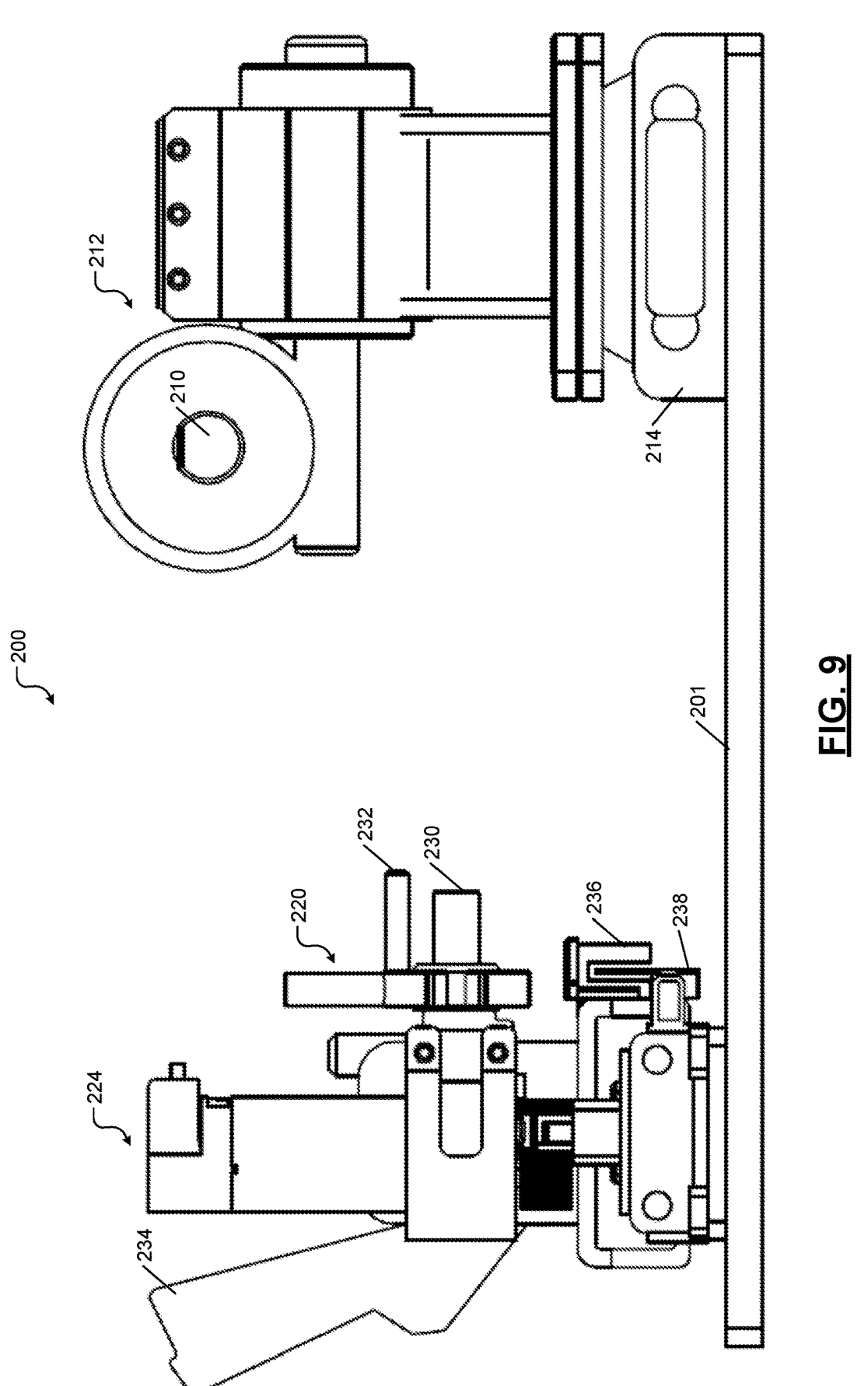
FIG. 9 shows a first side isometric view of the second system without the basket according to the present disclosure.
Figure 10:
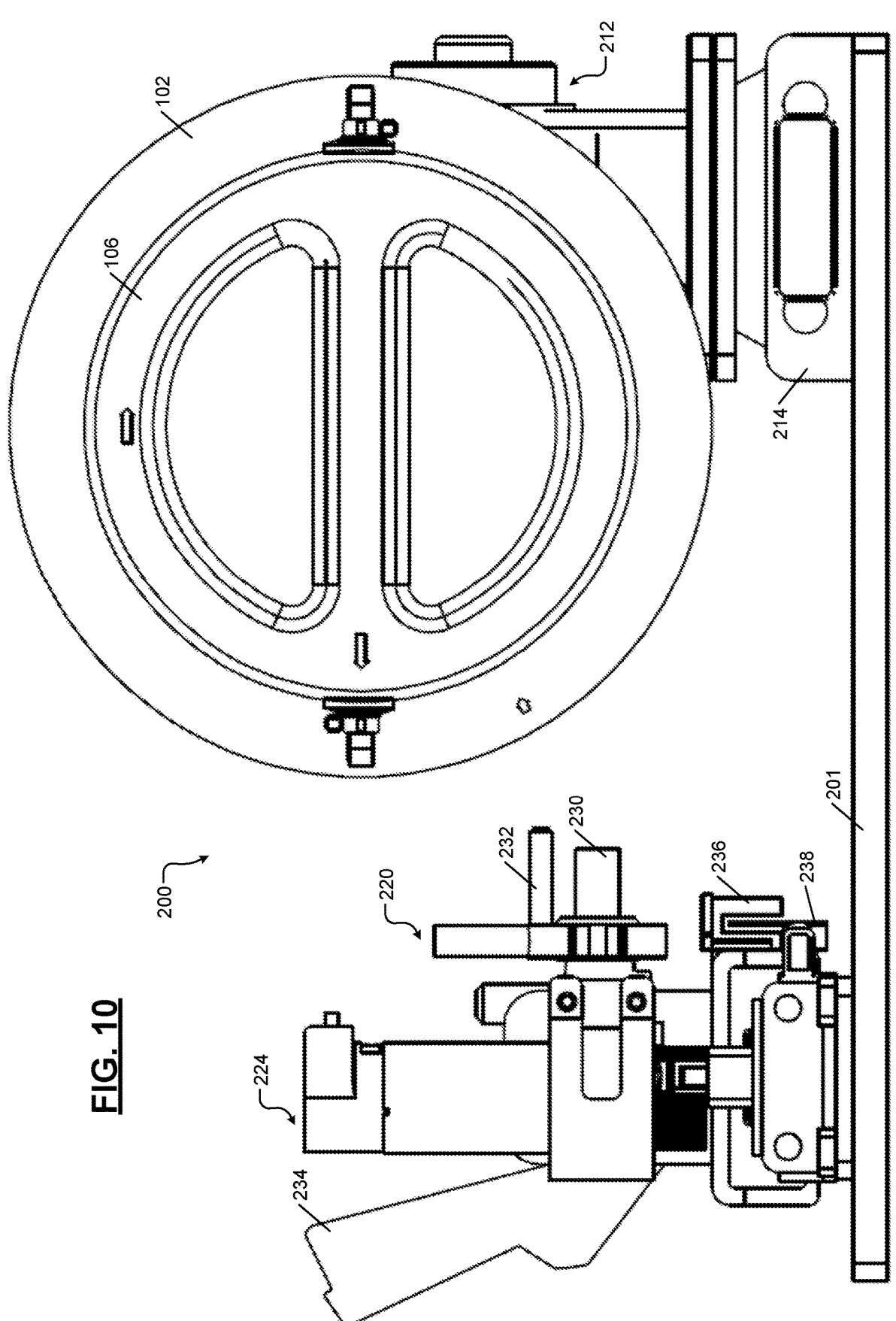
FIG. 10 shows a first side isometric view of the second system with the basket according to the present disclosure.
Figure 11:
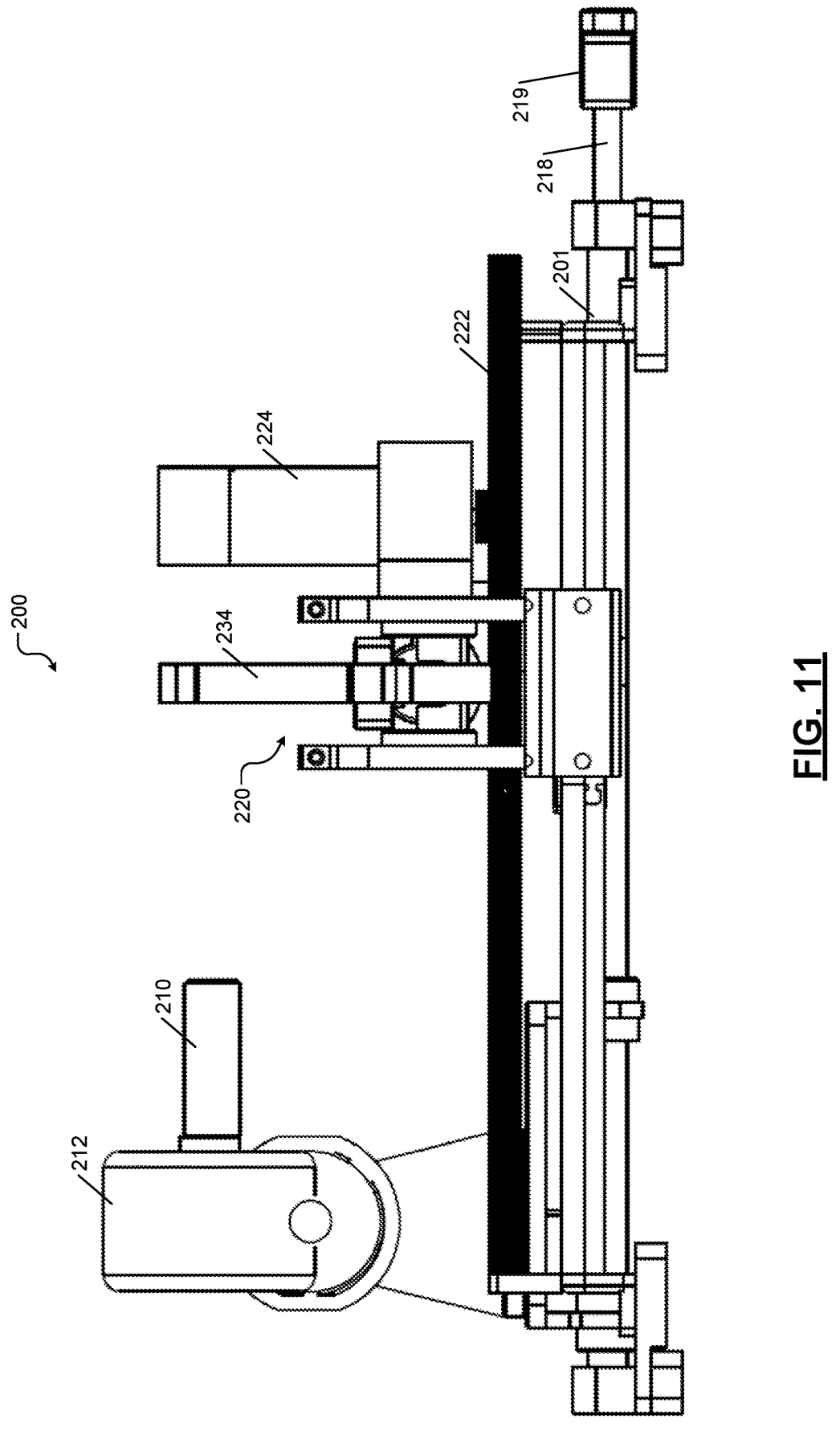
FIG. 11 shows a second side isometric view of the second system without the basket according to the present disclosure.
Figure 12:
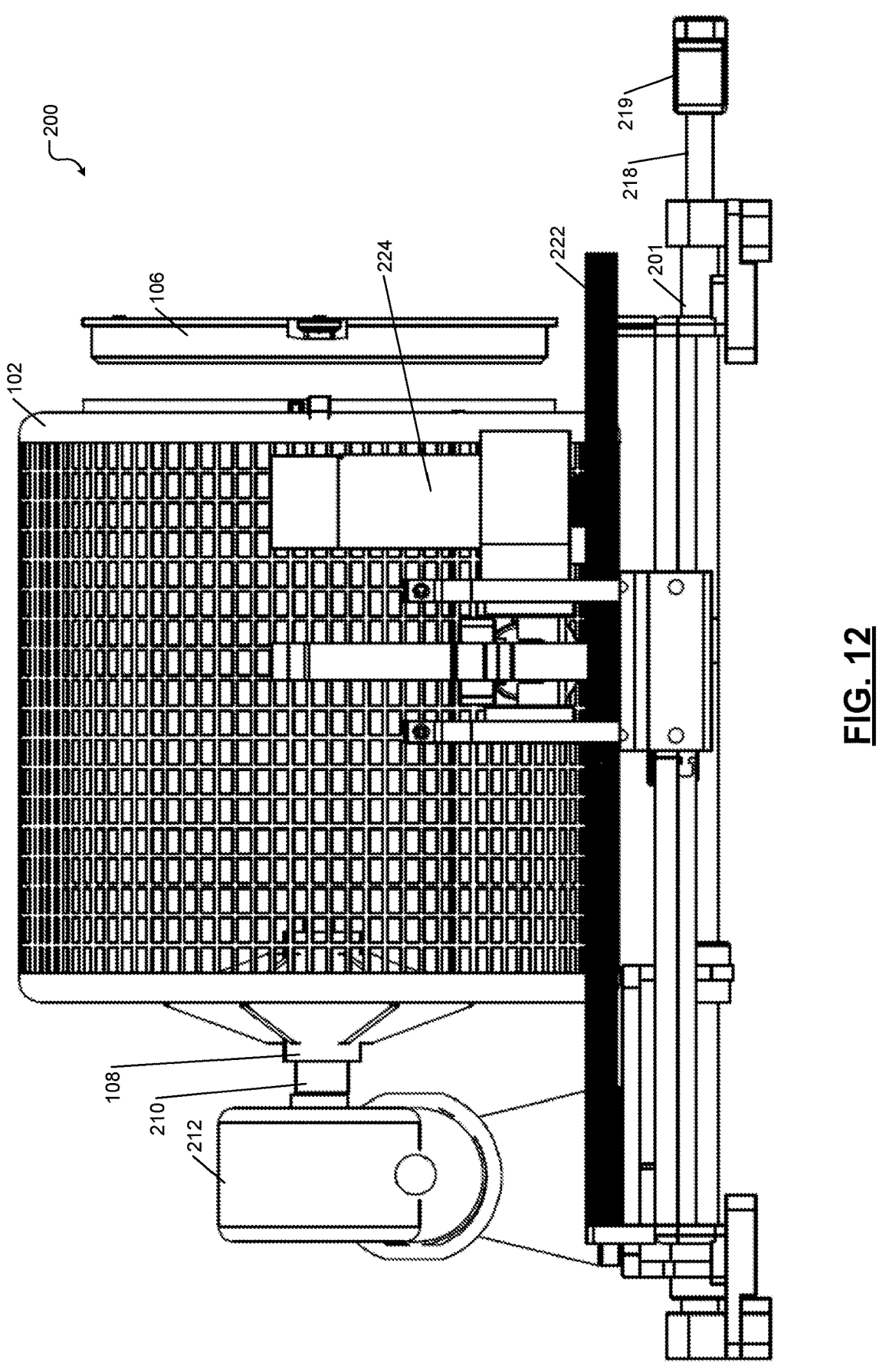
FIG. 12 shows a second side isometric view of the second system with the basket according to the present disclosure.
Figure 13:
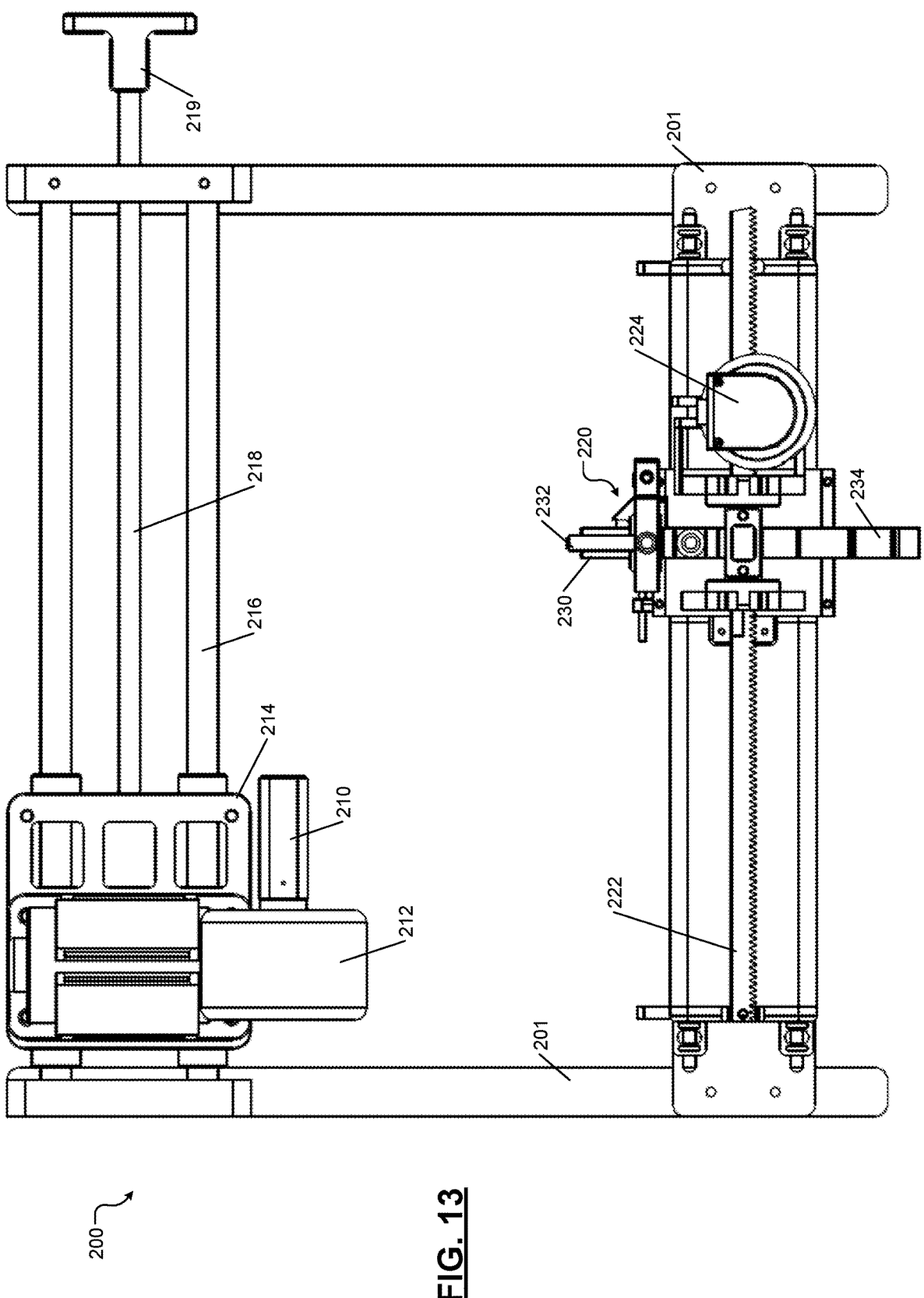
FIG. 13 shows a top view of the second system without the basket according to the present disclosure.
Figure 14:
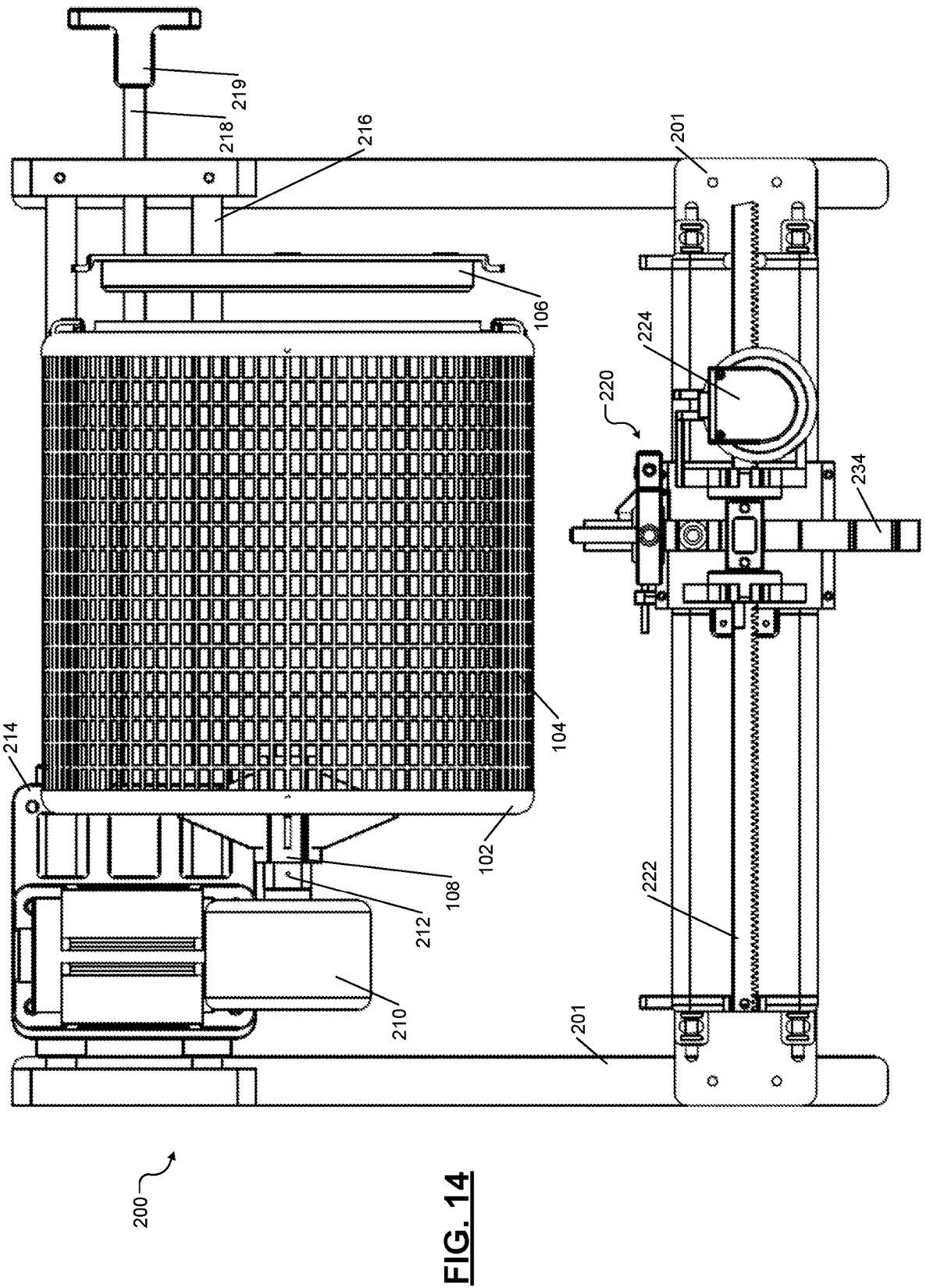
FIG. 14 shows a top view of the second system with the basket according to the present disclosure.
Figure 15:
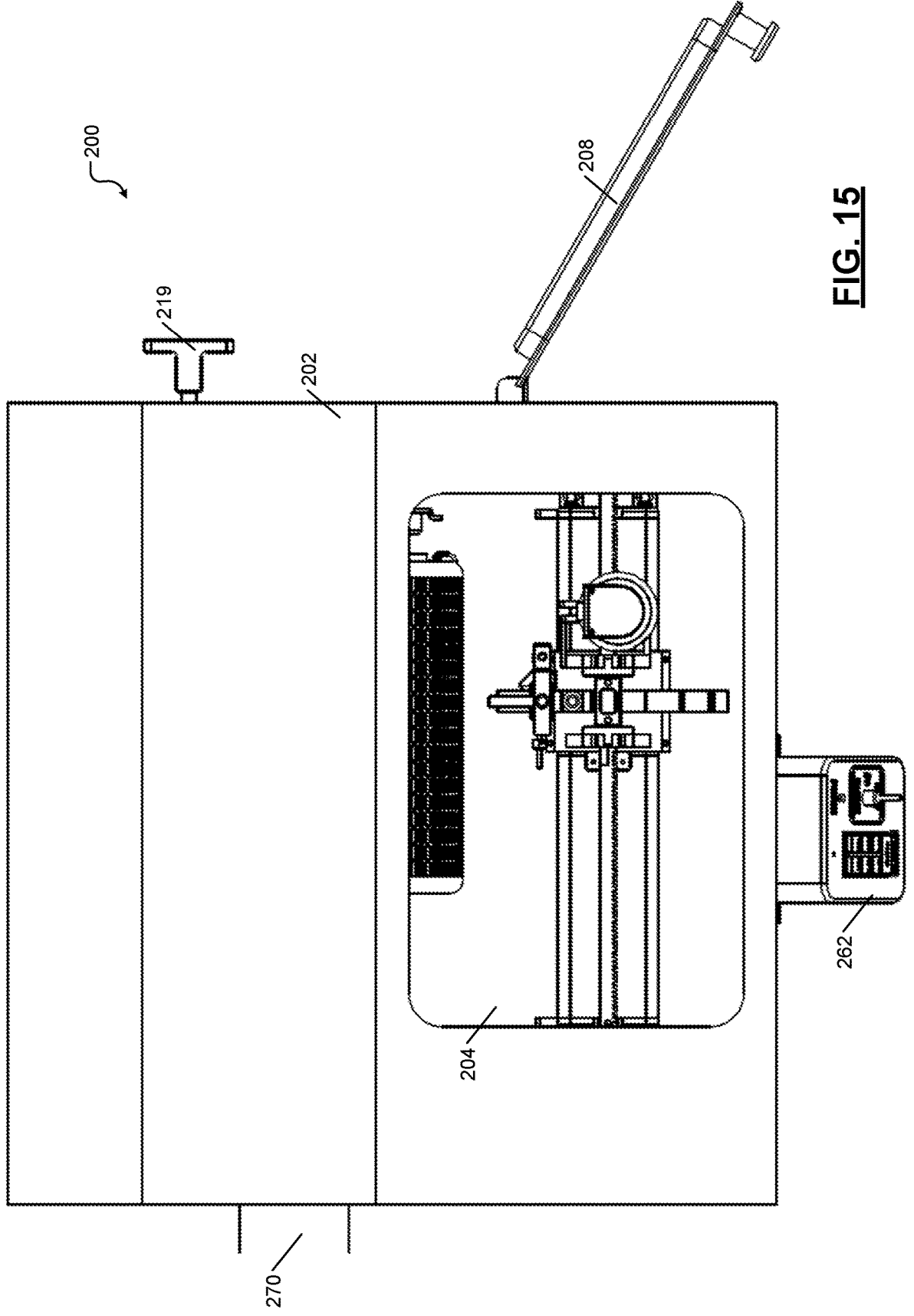
FIG. 15 shows a top view of the second system enclosed in an enclosure according to the present disclosure.
Figure 16:
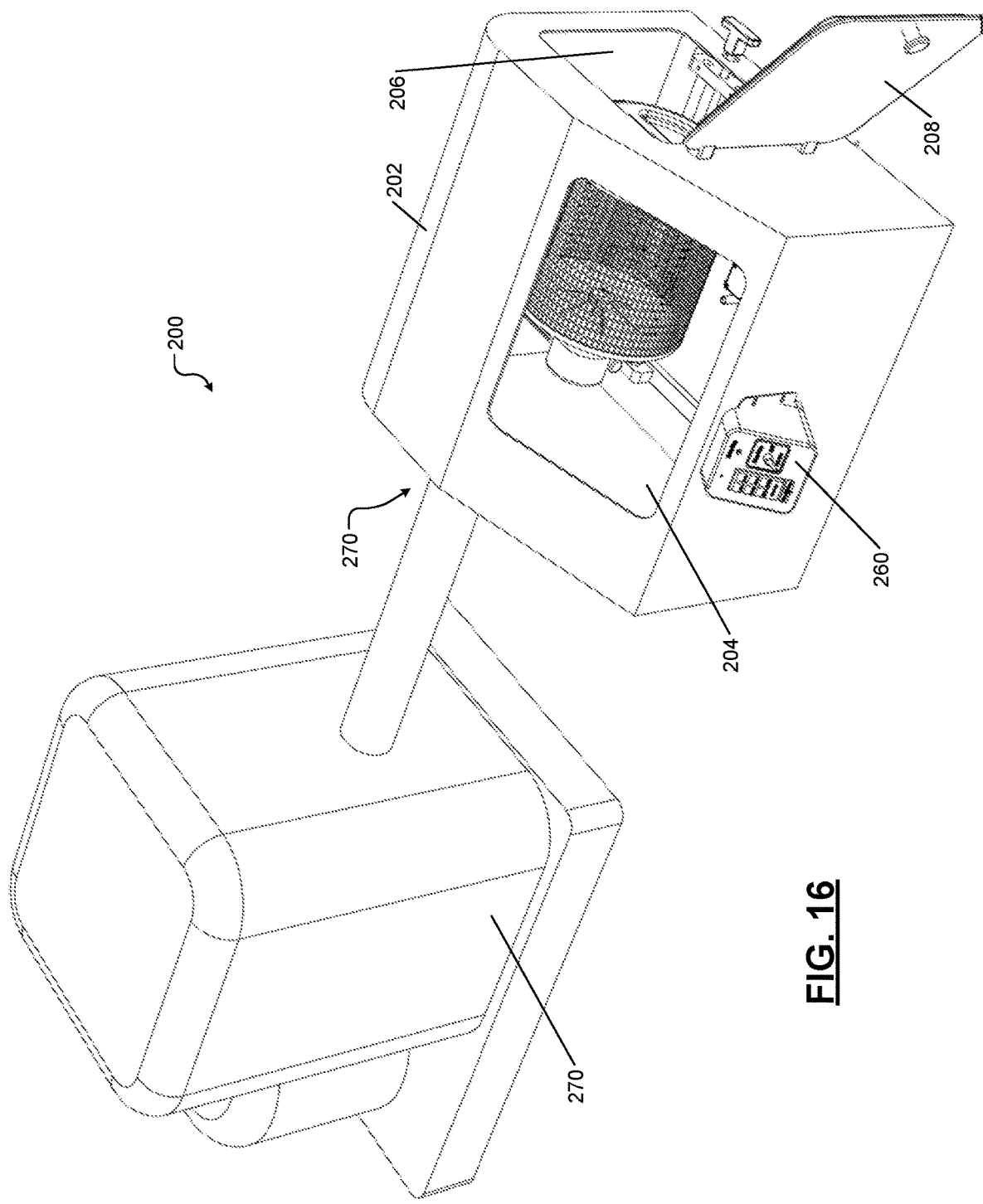
FIG. 16 shows a perspective view of the second system enclosed in the enclosure along with a suction system according to the present disclosure.
Figure 17:
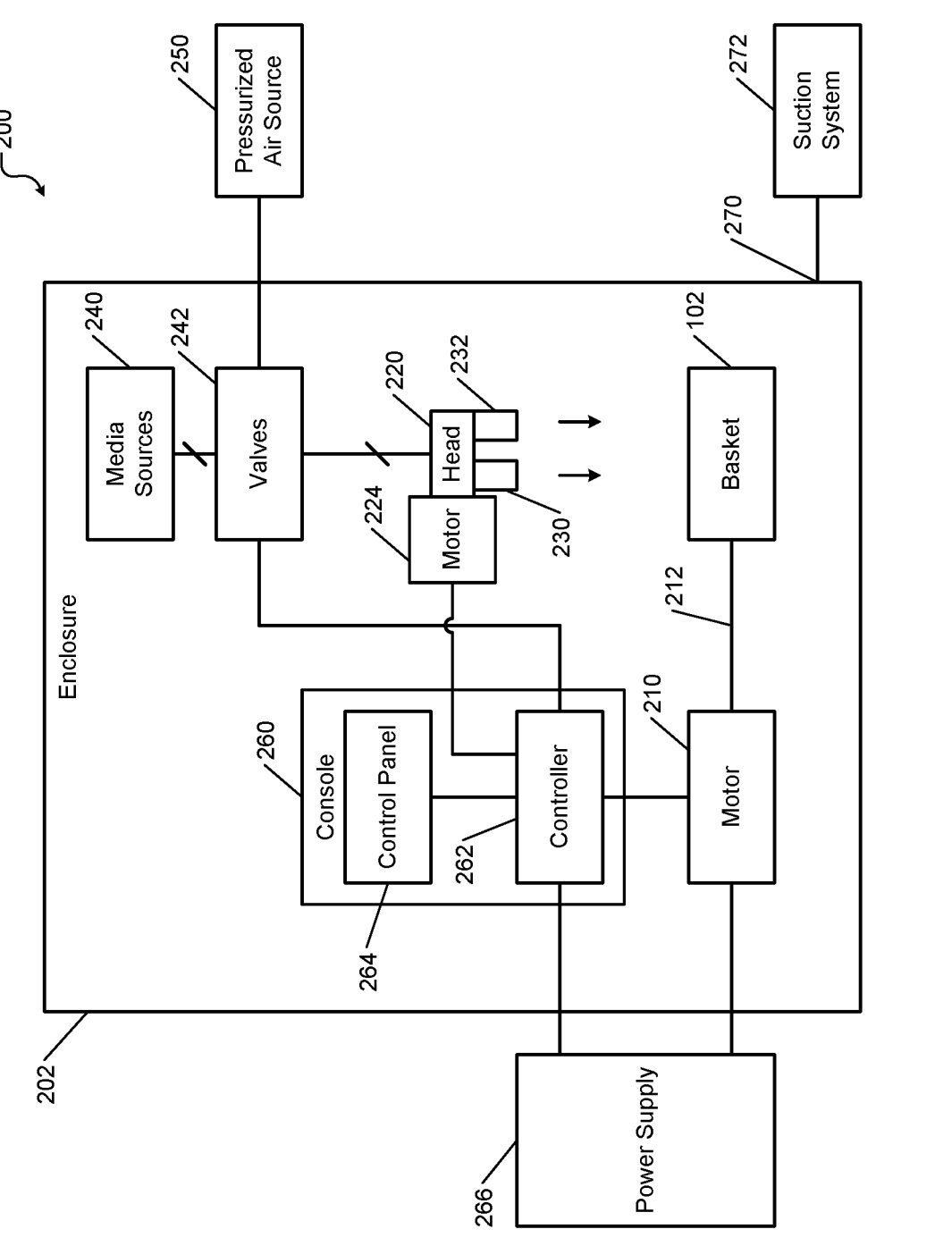
FIG. 17 shows a simplified functional block diagram of the second system according to the present disclosure.

FIGS. 7-14 show an example of a second system 200 according to the present disclosure. FIGS. 7 and 8 respectively show perspective views of the second system 200 without and with the basket. FIGS. 9-12 shows side isometric views of the second system 200 with and without the basket. FIGS. 13 and 14 respectively show top views of the second system 200 without and with the basket. FIG. 15 shows a top view of the second system 200 enclosed in an enclosure. FIG. 16 shows a perspective view of the second system 200 enclosed in the enclosure, together with a suction system attached to the enclosure. FIG. 17 shows a simplified block diagram of the second system 200 along with additional elements of the second system 200 described below. The second system 200 is described below by collectively referring to FIGS. 7-17.

In the second system 200, the first and second mechanisms described above are mounted to a frame 201 arranged in an enclosure 202 (shown in FIGS. 15 and 16). The enclosure 202 includes a window 204 (shown in FIGS. 15 and 16) for observation. The enclosure 202 includes an opening 206 with a door 208 for inserting the basket 102 into the enclosure 202 to mount the basket 102 on a shaft of a motor arranged in the enclosure 202.

The second system 200 comprises a motor 210 with a shaft 212. The motor 210 is mounted to the frame 201. For example, the motor 210 may be similar to the motor 112 of the first system 100. Specifically, the motor 210 is mounted on a mounting assembly 214. The mounting assembly 214 is mounted on a pair of rails 216 attached to the frame 201. A rod 218 parallel to the rails 216 is connected to the mounting assembly 214 on one end. The other end of the rod 218 extends through a hole in the frame 201 and is connected to a handle 219 outside the frame 201. The handle 219 facilitates inserting and removing the basket 102 in and out of the enclosure 202. The handle 219 can be used to pull and push the mounting assembly 214, along with the motor 210 and the basket 102 mounted on the shaft 212 of the motor 210, to help with loading/unloading of the basket 102. The mounting assembly 214 slides on the rails 216 when the handle 219 is pulled and pushed.

The basket 102 is inserted into the enclosure 202 through the opening 206 and is coupled to the motor 210 by inserting the shaft 212 of the motor 210 into the slot 108 of the basket 102. The handle 219 is used to pull the motor 210 out to load/unload the basket 102 on/from the shaft 212 of the motor 210. The handle 219 is used to push the motor 210 with or without the basket 102 into the enclosure 202 after loading or unloading the basket 102 on/from the shaft 212 of the motor 210. The door 208 of the enclosure 202 is closed during the operations performed by the second system 200, which are described below.

While not shown, a second, non-rotating shaft can be provided on an inner surface of the door 208. The second shaft can extend parallel to the frame 201 and can be aligned with the shaft 212 of the motor 210. The lid 106 (or the first end of the basket 102) can include a second slot similar to the slot 108 that can be inserted into the second shaft. When the second end of the basket 102 is mounted on the shaft 212 of the motor 210 and the door 208 is closed, the second shaft on the door 208 can be into the second slot of the basket 102. Accordingly, the basket 102 is supported on both ends. This can help secure the basket 102 when the basket 102 includes relatively heavier objects and/or when the objects in the basket 102 tend to accumulate towards the first end of the basket 102 when the basket 102 is rotated.

The second system 200 additionally comprises a head assembly 220 (also called a nozzle assembly) mounted to the frame 201. For example, the head assembly 220 is mounted on a track 222 attached to the frame 201. The track 222 is parallel to the axis of rotation of the basket 102 (and therefore also parallel to the shaft 212 of the motor 210). A motor 224 mounted to the frame 201 (e.g., on the track 222) moves the head assembly 220 bi-directionally (i.e., in an oscillating or reciprocal manner) along the track 222 relative to the length of the basket 102 (i.e., parallel to the axis of rotation of the basket 102).

First and second nozzles 230 and 232 are arranged on the head assembly 220. The first nozzle 230 is connected to one or more internal media sources 240 (shown in FIG. 17) via respective valves 242 (shown in FIG. 17). The media sources 240 supply bead-blasting materials (i.e., media with beads) having beads of different dimensions. For example, as described below, a first bead-blasting material comprising beads having first dimensions can be used to bead-blast the objects to remove residual powder from the objects before dying the objects. A second bead-blasting material comprising beads having second dimensions can be used to bead-blast the objects to provide a finish to the objects after dying and drying the objects.

The second nozzle 232 is connected to a pressurized air source 250 (shown in FIG. 17) via an additional valve in the valves 242 (shown in FIG. 17). The same pressurized air from the pressurized air source 250 can be used following both bead-blasting operations performed before and after dying the objects.

The first nozzle 230 is used to eject a medium including beads supplied by the media sources 240 onto the objects in the basket 102 in a direction perpendicular to the axis of rotation of the basket 102. The second nozzle 232 is used to eject pressurized air supplied by the pressurized air source 250 onto the objects in the basket 102 in the direction perpendicular to the axis of rotation of the basket 102. The basket 102 is rotated during the operations performed using the first and second nozzles 230, 232 as described below in further detail.

A pivot arm 234 moves (tilts) the head assembly 220 along an arc in a direction perpendicular to the axis of rotation of the basket 102 (i.e., perpendicular to the direction in which the head assembly 220 travels along the track 222). By moving the pivot arm 234, the angle of incidence of the first and second nozzles 230, 232 can be changed.

A travel sensor 236 and a sensor vane 238 sense the movement and position of the head assembly 220 along the track 222. The sensed movement and position of the head assembly 220 can be used (e.g., by a controller 262 shown in FIG. 17) to control the range and speed of bidirectional motion of the head assembly 220.

The second system 200 further comprises a console 260 (shown in FIGS. 15-17) including a controller 262 (shown in FIG. 17) attached externally to the enclosure 202. The console 260 includes a control panel 264 (including an input device such as a keypad, push buttons, or switches) connected to the controller 262. The control panel 264 can be used to select/set various parameters to control various aspects of the second system 200.

Non-limiting examples of the parameters include an amount of time for which the motor 210 rotates the basket 102 and the motor 224 oscillates the head assembly 220, the speeds at which the motor 210 rotates the basket 102 and the motor 224 oscillates the head assembly 220, and so on. For example, the speeds of the motors 210, 224 can be less for larger objects than for smaller objects. For example, the speeds of the motors 210, 224 can be selected such that the head assembly 220 oscillates once for every rotation of the basket 102. Other speed settings can be used.

Further, the control panel 264 can be used to select the medium to be supplied to the first nozzle 230 from the media sources 240. For example, a first medium including beads having first dimensions is selected for removing residual powder from the objects, and a second medium including beads having second dimensions is selected for providing a finish to the objects.

In addition, the control panel 264 can be used to control the valves 242 to control the pressures at which the media and the pressurized air are supplied to the first and second nozzles 230, 232, respectively. For example, based on the selected pressures, the controller 262 can operate the valves 242 coupled to the first and second nozzles 230, 232 to control the pressures of at which the medium and the pressurized air are ejected from the first and second nozzles 230, 232, respectively.

The console 260 can also include an output device (e.g., a display on the control panel 264) connected to the controller 162 to indicate an amount of processing time remaining once the processing begins. A power supply 266 (shown in FIG. 17) supplies power to the elements of the second system 200 (e.g., the motors 210, 224, and the console 260). The power supply 266 may be remote from the second system 200 or can be integrated into the second system 200.

In use, after the basket 102 containing the objects is processed in the first system 100 as described above, the same basket 102 with the same objects, after most of the powder is dislodged from them during the processing in the first system 100, is coupled to the shaft 212 of the motor 210 in the second system 200. The control panel 264 is used to select a first medium with beads having first dimensions. The control panel 264 is used to select a first amount of time for which to shoot the first medium at the objects in the basket 102. The control panel 264 is used to select a second amount of time for which to shoot the pressurized air at the objects in the basket 102 after the first amount of time elapses (i.e., after the bead-blasting using the first medium is finished).

The control panel 264 is used to select a first pressure at which the first medium is to be ejected from the first nozzle 230 towards the objects in the basket 102 in a direction perpendicular to the axis of rotation of the basket 102. The control panel 264 is used to select a second pressure at which to shoot the pressurized air at the objects in the basket 102 after the first amount of time elapses (i.e., after the bead-blasting using the first medium is finished). The control panel 264 is used to select the speeds of the motors 210, 224 based on the size and quantity of the objects in the basket. For example, the speeds can be less for larger objects than smaller objects. Further, the speeds can be less for relatively higher quantities of the objects in the basket 102 than smaller quantities.

As the processing begins, the motor 210 initially vibrates the basket 102 and then begins rotating the basket 102, and the motor 224 begins oscillating the head assembly 220 at the selected speeds. The first nozzle 230 shoots the first medium at the selected pressure onto the objects in the basket 102 while the basket 102 is rotated by the motor 210. The head assembly 220 oscillates at the selected speed of the motor 224. Accordingly, the objects in the rotating basket 102 are processed relatively uniformly, and the jet or the force of the first medium ejected by the first nozzle 230 does not damage the objects and the mesh of the basket 102.

After the amount of time selected to shoot the first medium elapses, the first nozzle 230 stops shooting the first medium at the objects in the basket 102, and the second nozzle 232 begins shooting pressurized air at the selected pressure at the objects in the basket 102 while the basket 102 is rotated by the motor 210. The head assembly 220 oscillates at the selected speed of the motor 224 while the second nozzle 232 shoots pressurized air at the objects in the basket 102.

Again, due to the rotation of the basket 102 and the bi-directional movement of the head assembly 220, the objects in the rotating basket 102 are processed relatively uniformly, and the jet or the force of the pressurized air ejected by the second nozzle 232 does not damage the objects and the mesh of the basket 102. The rotational speed of the motor 210 and the oscillating speed of the motor 224 may be different during bead-blasting than during the application of the pressurized air. The bead-blasting using the first medium and the application of the pressurized air removes the remaining residual powder from the objects in the basket 102.

The enclosure 202 includes an outlet 270 that is connected to a suction system 272. The suction system 272 can be turned on during the above operation of the second system 200. The suction system 272 can be operated separately (i.e., independently of the second system 200) or synchronously with the second system 200 (i.e., under the control of the controller 262 using the control panel 264). Likewise, the pressurized air source 250 can also be operated separately (i.e., independently of the second system 200) or synchronously with the second system 200 (i.e., under the control of the controller 262 using the control panel 264).

In the second system 200, the motors 210, 224 and the first and second nozzles 230, 232 are activated and deactivated together (i.e., synchronously) by the controller 262. Specifically, the basket 102 is not kept stationary when the first or second nozzles 230, 232 are operating. Optionally, the console 260 can be used to operate suction system 272 and the pressurized air source 250 separately (i.e., independently of the motors 210, 224 and the first and second nozzles 230, 232) or synchronously with the motors 210, 224 and the first and second nozzles 230, 232.

In some embodiments, a single nozzle may be used to supply a bead-blasting medium and supply the pressurized air. For example, a single nozzle may be used to first supply a bead-blasting medium and then supply the pressurized air. The valves 242 can be arranged and controlled such that a single nozzle may be used to switch between supplying one or more bead-blasting media followed by supplying the pressurized air through the single nozzle.

In some embodiments, one or more nozzles can be arranged differently than those shown without using the track 222. Specifically, any arrangement of one or more nozzles that can spray or dispense material (e.g., a medium containing beads and pressurized air) onto the objects in the rotating basket 102 in a bidirectional manner (i.e., from the first end to the second end of the basket 102 and then from the second end to the first end of the basket 102, repetitively) along the axis of rotation (i.e., along the length) of the basket 102 can be used.

For example, in a first alternate embodiment, the one or more nozzles may be arranged on the head assembly 220. The head assembly 220 can be arranged at an apex of an isosceles or an equilateral triangle with the axis of rotation of the basket 102 being the base of the triangle. The head assembly 220 can be rotated by the motor 224 around the apex and around an axis perpendicular to the axis of rotation of the basket 102. The head assembly 220 can be rotated in a bidirectional (oscillating) manner (i.e., from the first end to the second end of the basket 102 and then from the second end to the first end of the basket 102, repetitively) to spray material on to the objects in the rotating basket 102 along the axis of rotation (i.e., along the length) of the basket 102. The one or more nozzles can be controlled to dispense the material while the head assembly 220 rotates from the first end to the second end of the basket 102 and/or from the second end to the first end of the basket 102.

In an alternate arrangement, two nozzles can be located on the head assembly 220 arranged at the apex of the isosceles or the equilateral triangle as described above, and instead of rotating the head assembly 220, each nozzle can be rotated in a manner in which the rotation of the head assembly 220 is described above. For example, each nozzle can be rotated from the first end to the second end of the basket 102 and from the second end to the first end of the basket 102, repetitively. In this arrangement, one nozzle can be used for bead-blasting, and the other nozzle can be used for applying pressurized air. Alternatively, both nozzles can be operated at the same time, and one nozzle rotated from the first end to the second of the basket 102 while the other nozzle is rotated from the second end to the first end of the basket 102. In this example, both nozzles can be used to dispense the same material. For example, both nozzles can dispense a medium containing beads during bead blasting, and subsequently, both nozzles can dispense pressurized air.

Alternatively, when both nozzles can be rotated as described above, one nozzle may be rotated from the first end of the basket 102 to a midpoint between the first end and the second end of the basket 102, and the other nozzle may be rotated from the second end of the basket 102 to the midpoint between the first end and the second end of the basket 102. In this arrangement, both nozzles can dispense the same material. For example, both nozzles can dispense a medium containing beads during bead blasting, and subsequently, both nozzles can dispense pressurized air.

In a second alternate embodiment, a plurality of nozzles can be spaced apart along an axis parallel to the axis of rotation of the basket 102 (e.g., on a line where the track 222 is shown). For example, a first nozzle near a first end of the line may be located opposite and proximate to the first end of the basket 102 while a second nozzle near a second end of the line may be located opposite and proximate to the second end of the basket 102. Each of these nozzles can be rotated similar to the head assembly 220 and the nozzles as described above. For example, the first nozzle may be rotated from the first end to the second end of the basket, and the second nozzle may be rotated from the second end to the first end of the basket 102. In this arrangement, both nozzles can dispense the same material. For example, both nozzles can dispense a medium containing beads during bead blasting, and subsequently, both nozzles can dispense pressurized air.

Alternatively, the first nozzle may be rotated from the first end of the basket 102 to a midpoint between the first end and the second end of the basket 102, and the other nozzle may be rotated from the second end of the basket 102 to the midpoint between the first end and the second end of the basket 102. In this arrangement, both nozzles can dispense the same material. For example, both nozzles can dispense a medium containing beads during bead blasting, and subsequently, both nozzles can dispense pressurized air.

Accordingly, in general, the second system 200 comprises the frame 201, the motor 210 mounted to the frame 201, the basket 102 connected to the shaft 212 of the motor 210, and the nozzle assembly 220 connected to the frame 201. The nozzle assembly 220 includes a nozzle (i.e., one or more nozzles) to dispense at least one of an abrasive material (e.g., a bead-blasting medium) and a pressurized gas (e.g., air) onto the meshed wall 104 of the basket 102 while the motor 210 initially vibrates the basket 102 and then rotates the basket 102. The nozzle assembly 220 causes the nozzle to reciprocate horizontally across the meshed wall 104 of the basket 102 as the motor 102 rotates the basket 102. The nozzle assembly 220 varies the direction in which the nozzle ejects the at least one of the abrasive material and the pressurized gas across the meshed wall 104 of the basket 102 as the motor 210 rotates the basket 102.

The nozzle assembly 220 can include N nozzles, where N is an integer greater than or equal to 2. At least two of the N nozzles can direct the at least one of the abrasive material and the pressurized gas into the meshed wall 104 of the basket 102 from different directions (i.e., and different incident angles). Alternatively, a first set of the N nozzles can direct the abrasive material into the meshed wall surface, and a second set of the N nozzles can direct the pressurized gas onto the meshed wall surface. In one implementation, the first and second sets of the N nozzles can be on at the same time (e.g., when both the first and second sets of the N nozzles eject the abrasive material or the pressurized gas). In another implementation, the first and second sets of the N nozzles alternate being on (e.g., when both the first and second sets of the N nozzles eject the abrasive material or the pressurized gas, or when the first and second sets of the N nozzles respectively eject the abrasive material or the pressurized gas. In yet another implementation, nozzles in the first set of the N nozzles can have different incident angles. In still another implementation, nozzles in the second set of the N nozzles have different incident angles.

In another embodiment, a nozzle may be arranged at a central location relative to the axis of rotation of the basket 102 (e.g., at an apex of an isosceles or an equilateral triangle with the base being axis of rotation of the basket 102). The nozzle may pivot in the center rotating approximately 45 degrees, for example, from the center perpendicularly to the basket 102 (i.e., a total of about 90 degrees). The movement of the nozzle can be up and down (vertical) and/or side-to-side (horizontal). This can eliminate the need for a sliding mechanism. Alternatively, the nozzle can rotated along a circular or an elliptical path, with the path forming a base of a conical structure with the nozzle being at the vertex of the cone.

In yet another embodiment, a pivoting nozzle as described above can be mounted on a linear slide (e.g., the track 222). Thus, linear motion along the axis of the basket can be added to the rotating motion of the nozzle. During blasting, the nozzle can be centered and kept stationary but rotating, or the nozzle can be rotating and moving linearly at the same time.

Figure 18:
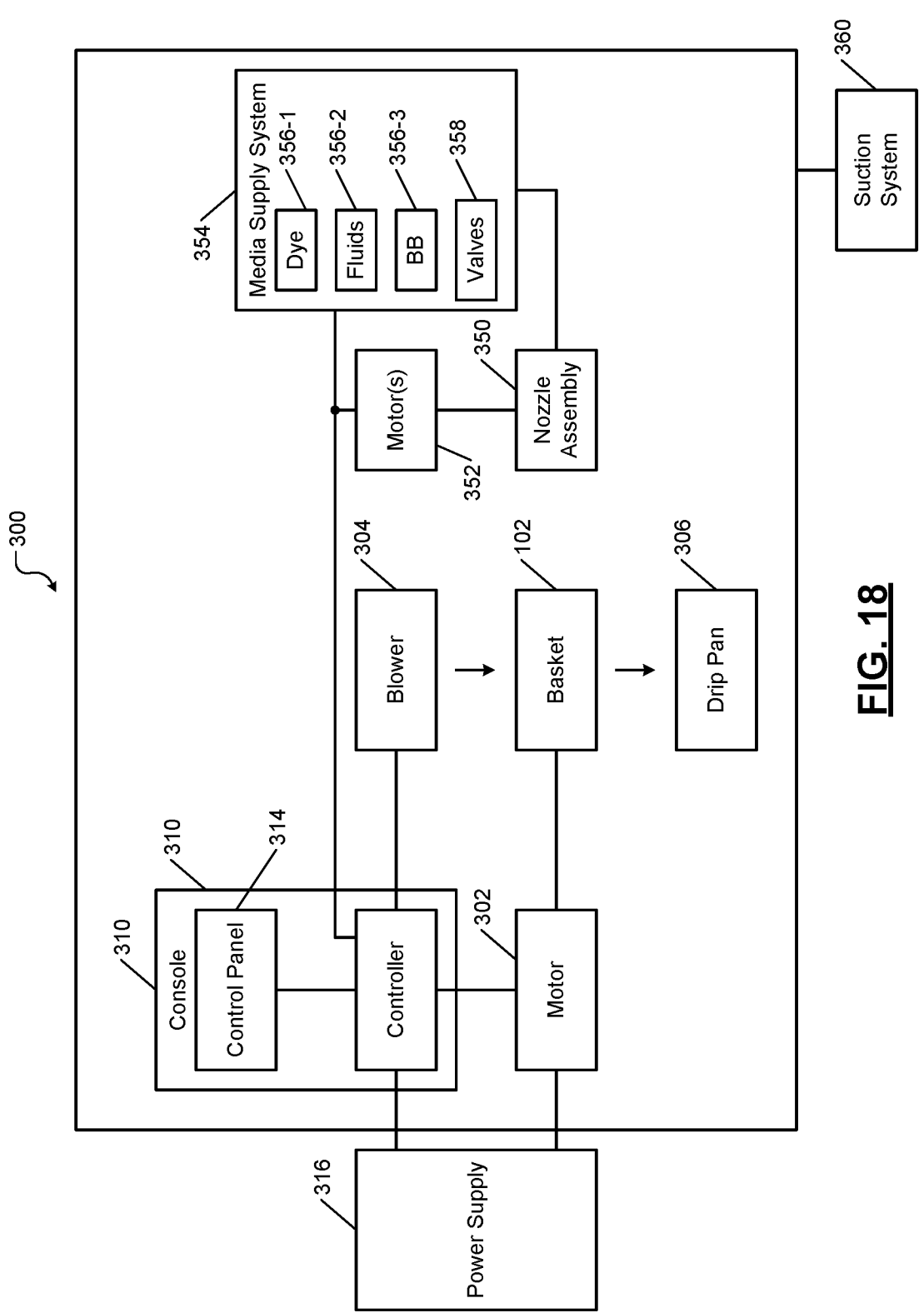
FIG. 18 shows a simplified block diagram of an example of a third system for processing objects printed on a 3D printer according to the present disclosure.

FIG. 18 shows a third system 300 according to the present disclosure. After the objects in the basket 102 are processed in the first and second systems 100, 200, the basket 102 including the cleaned objects is removed from the second system 200 and optionally immersed in a dye bath. After dying is complete, the basket 102 including the dyed objects is rinsed and removed to the third system 300 where the objects are air-dried using forced air from a blower as follows.

The third system 300 comprises a motor 302 that is similar to the motors 112 and 210 of the systems 100 and 200. The motor 302 is mounted to a frame. The basket 102 is removably coupled to a shaft of the motor 302. In some embodiments, an additional support may be provided to the first end of the basket 102 when the second end of the basket 102 is mounted on the shaft of the motor 302 as follows. For example, opposite to the motor 302, a vertical portion may extend vertically upwards from the frame. The vertical portion may be able to swivel or bend slightly relative to the vertical axis. At a distal (i.e., top) end of the vertical portion, a second, non-rotating shaft can be provided. The second shaft can extend horizontally and can be aligned with the shaft of the motor 302. The lid 106 (or the first end of the basket 102) can include a second slot similar to the slot 108 that can be inserted into the second shaft. When the second end of the basket 102 is mounted on the shaft of the motor 302, the vertical portion can be slightly swiveled to insert the second shaft into the second slot of the basket 102. Accordingly, the basket 102 is supported on both ends. This can help secure the basket 102 when the basket 102 includes relatively heavier objects and/or when the objects in the basket 102 tend to accumulate towards the first end of the basket 102 when the basket 102 is rotated.

The third system 300 comprises a blower 304 that is arranged adjacent to and facing the basket 102 to blow forced air onto the objects in the basket 102 as the basket 102 is rotated by the motor 302. A drip pan or a tray is placed under the basket 102 to collect any residual dye and/or liquid used for rinsing (e.g., water) that may drop from the objects rotating in the basket 102.

The third system 300 may simply include switches to turn on and off the motor 302 and the blower 304. Alternatively, the third system 300 can comprise a console 310 including a controller 312 and a control panel 314 (including an input device such as a keypad, push buttons, or switches) connected to the controller 312 to enter control parameters for the third system 300. Non-limiting examples of the control parameters include an amount of time for which the motor 302 rotates the basket 102, the rotational speed at which the motor 302 rotates the basket 102, the amount of time for which the blower 304 is turned on, the speed of the blower 304, and so on. Again, the speeds of the motor 302 and the blower 304 may depend on the size and the quantity of the objects in the basket 102, the dye used, and so on.

The console 310 can also include an output device (e.g., a display on the control panel 314) connected to the controller 312 to indicate an amount of time remaining once the processing begins. Optionally, the controller 312 can operate the motor 302 and the blower 304 synchronously (i.e., turning the motor 302 and the blower 304 on and off together). A power supply 316 supplies power to the components of the third system 300 (e.g., motor 302, the blower 304, and the console 310). The blower 304 may receive power directly from an AC wall outlet. The third system 300 may or may not be arranged in an enclosure.

In use, the basket 102 including the dyed and rinsed objects is coupled to the motor 302 in the same manner as in the first system 100. If the third system 300 does not include the console 310, the motor 302 and the blower 304 are simply turned on for a period of time and then turned off using respective switches that operate the motor 302 and the blower 304. If the third system 300 includes the console 310, the console 310 is used to select/set the amount of time for which the motor 302 rotates the basket 102, and the speeds of the motor 302 and the blower 304. The forced air from the blower 304 dries the objects in the basket 102 while the motor 302 rotates the basket 102. The drip pan 306 collects any residual dye and the rinsing liquid that may drip from the objects while the basket 102 rotates.

After drying, the basket 102 including the dyed and dried objects can be optionally returned to the second system 200 where the objects can be again bead-blasted using a second medium to provide a finish to the objects. The second medium can be different than the first medium used earlier to remove residual powder from the objects before the objects are dyed. The bead-blasting using the second medium is performed similar to the bead-blasting using the first medium described above. The bead-blasting using the second medium can be optionally followed by application of the pressurized air as described above. The finished objects are now ready for use.

In another embodiment, a multipurpose system comprising a water tight enclosure may be used for water-related (wet) treatments/dying of the objects. The water tight enclosure may include one or more nozzles that can be operated similar to the nozzles described above. The multipurpose system can facilitate cleaning of the objects using water and/or a chemical, and subsequent dying, rinsing, and drying of the objects. The multipurpose system can include a motor similar to the motor 112. The objects may be rotated in the basket 102 using the motor during one or more of these operations.

For cleaning the objects, pressurized hot water can be used in addition to bead-blasting. The pressurized water dispensed through a nozzle can include a cleaning chemical agent and be administered at a relatively high temperature. The objects can then be dyed by spraying them with a high temperature dye. After dying, the objects can be sprayed using a nozzle with water before drying. Then the objects can be dried using high pressure air nozzles/jets, the blower 304, or both. In addition to using the blower 304 to dry parts after dying, compressed air through a nozzle/jet may be more effective or practical. Further, any desired finish using bead blasting can also be provided in the multipurpose system.

Thus, the multipurpose system can automate and accelerate the processes of cleaning of the objects using water and/or a chemical, and subsequent dying, rinsing, and drying of the objects using a motor and one or more nozzles controlled as described above. The multipurpose system can perform these operations in a single enclosure while eliminating various processing steps such as suspending the objects in a dye bath, then rinsing the objects, and subsequently separately drying the objects. No manual handling of the objects is necessary during or between any of these operations performed in the single enclosure. Further, the multipurpose system also eliminates the need for multiple processing stations that are otherwise required for performing these operations separately.

For example, the multipurpose system can comprise a nozzle assembly 350 with one or more nozzles and one or more motors 352 to rotate and/or linearly move the nozzle assembly 350 as described above. Further, the multipurpose system can include a media supply system 354 comprising various media such as a dye 356-1, pressurized and temperature controlled fluids (e.g., water, chemical agent, air/gas etc.) 356-2, and a bead-blasting medium 356-3 (collectively media 356). The media supply system 354 can include valves 358 that can be controlled to supply any of the media 356 under different pressures and temperatures as described above. The multipurpose system can include an exhaust system 360 to evacuate the media 356 dispensed from the nozzles.

The power supplies described throughout the present disclosure can supply DC power to the elements of the respective systems such as the motors, consoles, and so on. In some embodiments, the motor used to rotate the basket in one or more of the systems may be an AC motor or any suitable motor that can provide the torque needed to rotate the basket including the objects. The blower can also be operated by the DC power or may be directly connected to an AC wall outlet in some embodiments.

Figures 20, 21:
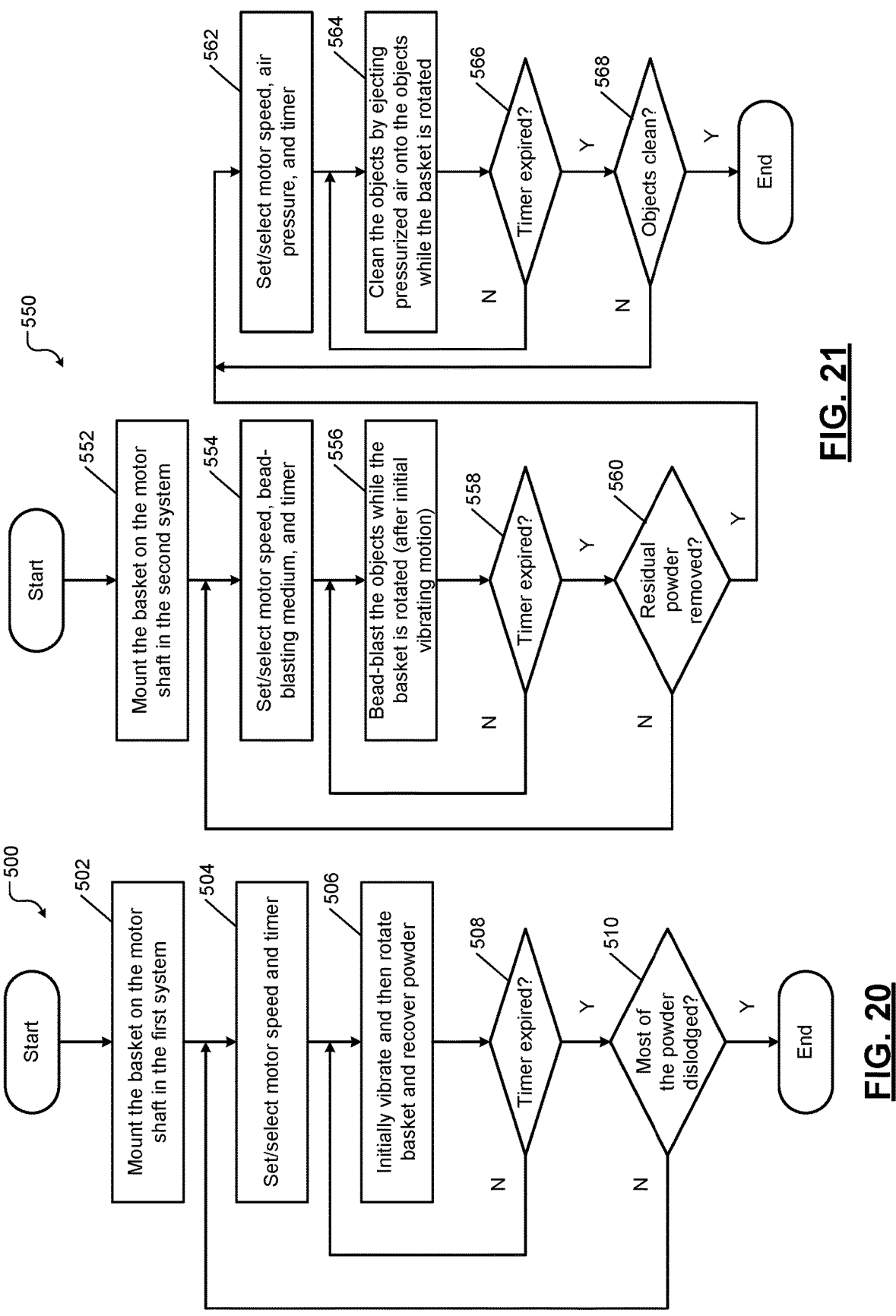
FIG. 20 shows a method for removing chunks of powder attached to 3D printed objects according to the present disclosure.
FIG. 21 shows a method for removing residual powder from 3D printed objects according to the present disclosure.

FIGS. 19-23 show various methods performed using one or more of the first, second, and third systems 100, 200, 300. FIG. 19 shows a method 400 that includes all of the processing performed using the first, second, and third systems 100, 200, 300. FIG. 20 shows a method 500 performed using the first system 100. FIG. 21 shows a method 550 performed using the second system 200 after the method 500 is performed and before dying the objects. FIG. 22 shows a method 600 performed using the third system 300 after dying the objects. FIG. 23 shows a method 650 performed using the second system 200 after dying the objects. These methods are now described below in turn. In the following description, the term control is used to denote operations performed by or using the controller and/or console of one or more of the first, second, and third systems 100, 200, 300.

FIG. 19 shows the method 400 that includes all of the processing performed using the first, second, and third systems 100, 200, 300. At 402, the method 400 determines whether objects printed using a 3-D printer are available for post processing. The method 400 waits until the objects printed using a 3-D printer are available for post processing. The method 400 proceeds to 404 after the objects printed using a 3-D printer are available for post processing.

At 404, the powder bed including the printed objects is moved to a post processing unit associated with the 3-D printer. At 406, the method 400 determines whether the objects in the powder bed have cooled. The method 400 waits until the objects in the powder bed have cooled. The method 400 proceeds to 408 after the objects in the powder bed have cooled.

At 408, the objects are extracted from the powder bed, with chunks of powder still attached to the objects, and the objects are placed in the basket (e.g., basket 102). At 410, the basket including the objects with chunks of powder still attached to the objects is coupled to a motor (e.g., motor 112 of the first system 100). At 412, control initially vibrates the basket and then rotates the basket to dislodge most of the powder from the objects. The powder dislodged from the objects is recovered for recycling.

At 414, the method 400 determines if most of the powder attached to the objects is dislodged from the objects. The method 400 returns to 412 if most of the powder attached to the objects is not dislodged from the objects. The method 400 proceeds to 416 if most of the powder attached to the objects is dislodged from the objects.

At 416, the basket including the objects is moved to another system (e.g., from the first system 100 to the second system 200). At 418, the basket including the objects, with residual powder remaining attached to the objects, is coupled to a motor (e.g., motor 210 of the second system 200). At 420, control subjects the objects in the basket to bead blasting while the basket is rotated by the motor. At 422, after the bead blasting, control subjects the objects in the basket to pressurized air while the basket is rotated by the motor.

At 424, the method 400 determines if the objects are clean (i.e., if the residual powder is removed from the objects by the bead-blasting and the application of the pressurized air). The method returns to 422 or optionally to 420 if the objects are not clean (i.e., if the residual powder is not removed from the objects by the bead-blasting and the application of the pressurized air). The method 400 proceeds to 426 is the objects are clean.

At 426, the method 400 determines whether to dye the objects. The method 400 ends if the objects do not have to be dyed. The method 400 proceeds to 428 if the objects are to be dyed. At 428, the basket including the clean objects is removed from the second system 200 and is immersed in a dye bath. At 430, the method 400 determines if the objects are dyed. The method 400 waits until the objects are dyed. After the objects are dyed, the method 400 proceeds to 432. At 432, the basket including the dyed objects is rinsed (e.g., using a suitable solvent such as water that can wash the dye off the basket and the objects).

At 434, the basket including the dyed and rinsed objects is coupled to another motor (e.g., motor 302 of the third system 300). At 436, the objects in the basket are air dried by subjecting the objects to forced air from a blower (and/or compressed air) while the basket is rotated by the motor. At 438, the method 400 determines if the objects in the basket are dry. The method 400 returns to 436 if the objects are not dry. The method proceeds to 440 if the objects are dry.

At 440, the method 400 determines whether to provide a finish to the objects. The method 440 ends if no finish is needed. The method 400 proceeds to 442 if a finish is to be provided to the objects. At 442, the basket including the dried objects is returned to the second system 200. At 444, the basket is coupled to the motor (e.g., motor 210) of the second system 200. At 446, control subjects the objects in the basket to bead blasting using another bead-blasting medium while the basket is rotated by the motor. After the bead-blasting, control optionally subjects the objects in the basket to pressurized air while the basket is rotated by the motor.

At this point, the objects in the basket have a desired finish, and the objects are ready for use. The method 400 ends. While not shown, the method 400 may determine whether the objects in the basket have the desired finish and may return to 446 if the objects do not have the desired finish.

FIG. 20 shows a method 500 performed using the first system 100. The method 500 dislodges most the chunks of powder attached to the 3D printed objects after the objects have cooled and are extracted from the powder bed of the 3D printer. At 502, a basket (e.g., basket 102) including the objects with chunks of powder still attached to the objects is mounted on a motor shaft (e.g., motor 112 of the first system 100). At 504, the method 500 selects/sets a speed of the motor and an amount of time for which to spin the basket.

At 506, control initially vibrates the basket and then rotates the basket at the selected speed for the selected amount of time. The powder dislodged from the objects is recovered for recycling. At 508, control determines if the selected time has elapsed. Control returns to 506 if the selected time has not elapsed. Control proceeds to 510 if the selected time has elapsed. At 510, the method 500 determines if most of the powder is dislodged from the objects. The method 500 returns to 504 if most of the powder is not dislodged from the objects. The method 500 ends if most of the powder is dislodged from the objects.

FIG. 21 shows a method 550 performed using the second system 200 before dying the objects. The method 550 can be performed after performing the method 500 using the first system 100. In some instances, if the objects extracted from the powder bed do not have chunks of powder attached to them, the method 500 (i.e., processing in the first system 100) may be skipped, and the method 550 (i.e., processing in the second system 200) may be performed directly.

At 552, a basket (e.g., basket 102) containing objects with residual powder attached is mounted on a motor shaft (e.g., motor 210 of the second system 200). At 554, the method 500 selects/sets speeds of the motors used for rotating the basket and for oscillating nozzles (e.g., first and second nozzles 330, 332), an amount of time for which to spin the basket and oscillate the nozzles, and optionally the pressure at which to eject the bead-blasting medium from the nozzle.

At 556, control initially vibrates the basket and then subjects the objects in the basket to bead blasting while rotating the basket and while oscillating the nozzle used to bead-blast the objects at the selected speeds and pressure and for the selected amount of time. At 558, control determines if the selected time has elapsed. Control returns to 556 if the selected time has not elapsed. Control proceeds to 560 if the selected time has elapsed. At 560, the method 550 determines if the residual powder is removed from the objects. Control returns to 554 if the residual powder is not removed from the objects. Control proceeds to 562 if the residual powder is removed from the objects.

At 562, the method 550 selects/sets speeds of the motors used for rotating the basket and for oscillating nozzles (e.g., first and second nozzles 330, 332), an amount of time for which to spin the basket and oscillate the nozzles, and optionally the pressure at which to eject the pressurized air from the nozzle. At 564, control subjects the objects in the basket to pressurized air while rotating the basket and while oscillating the nozzle used to shoot the pressurized air at the objects at the selected speeds and pressure and for the selected amount of time.

At 566, control determines if the selected time has elapsed. Control returns to 564 if the selected time has not elapsed. Control proceeds to 568 if the selected time has elapsed. At 568, the method 550 determines if the objects in the basket are clean. Control returns to 562 if the objects in the basket are not clean. The method 550 ends if the objects are clean.

FIG. 22 shows a method 600 performed using the third system 300 after dying and rinsing the objects. The method 600 rapidly dries the dyed and rinsed objects. At 602, a basket (e.g., basket 102) including the objects with the residual powder removed from the objects is mounted on a motor shaft (e.g., motor 302 of the third system 300). At 604, the method 600 selects/sets speeds of the motor and a blower used to force air onto the objects in the basket and selects/sets an amount of time for which to spin the basket while blowing the forced air on the objects.

At 606, control initially vibrates the basket and then rotates the basket at the selected speed. At 608, control operates the blower at the selected speed for the selected amount of time to subject the objects in the rotating basket to forced air supplied by the blower. Alternatively or additionally, compressed air may be used. At 610, control determines if the selected time has elapsed. Control returns to 606 if the selected time has not elapsed. Control proceeds to 612 if the selected time has elapsed. At 612, the method 600 determines if the objects in the basket are dry. The method 600 returns to 604 if the objects in the basket are not dry. The method 600 ends if the objects are dry.

FIG. 23 shows a method 650 performed using the second system 200 after dying and drying the objects (in the third system 300 as described in the method 600) to provide a finish to the objects. At 652, a basket (e.g., basket 102) containing objects that are dyed and dried (in the third system 300 as described in the method 600) is mounted on a motor shaft (e.g., motor 210 of the second system 200). At 654, the method 600 selects/sets speeds of the motors used for rotating the basket and for oscillating nozzles (e.g., first and second nozzles 330, 332), an amount of time for which to spin the basket and oscillate the nozzles, and optionally the pressure at which to eject the bead-blasting medium from the nozzle. The bead-blasting medium used in the method 650 may be different than that used in the method 550 as explained above.

At 656, control initially vibrates the basket and then subjects the objects in the basket to bead-blasting while rotating the basket and while oscillating the nozzle used to bead-blast the objects at the selected speeds and pressure and for the selected amount of time. At 658, control determines if the selected time has elapsed. Control returns to 656 if the selected time has not elapsed. Control proceeds to 660 if the selected time has elapsed. At 660, the method 650 determines if the objects in the basket have the desired finish. Control returns to 654 if the objects do not have the desired finish. Control proceeds to 662 if the objects have the desired finish.

At 662, the method 650 determines if the objects in the basket are clean after the bead blasting. The method 650 ends if the objects are clean after the bead blasting. The method 650 proceeds to 664 if the objects are not clean after the bead blasting. At 664, the method 650 selects/sets speeds of the motors used for rotating the basket and for oscillating nozzles (e.g., first and second nozzles 330, 332), an amount of time for which to spin the basket and oscillate the nozzles, and optionally the pressure at which to eject the pressurized air from the nozzle. At 666, control subjects the objects in the basket to pressurized air while rotating the basket and while oscillating the nozzle used to shoot the pressurized air at the objects at the selected speeds and pressure and for the selected amount of time.

At 668, control determines if the selected time has elapsed. Control returns to 666 if the selected time has not elapsed. Control proceeds to 670 if the selected time has elapsed. At 670, the method 650 determines if the objects in the basket are clean. Control returns to 664 if the objects are not clean. The method 650 ends if the objects in the basket are clean.

Accordingly, as explained above, after the 3D printed objects are extracted from the powder bed and are placed in the basket 102, the objects are not manually handled until the objects are automatically cleaned (i.e., de-powdered), dyed, rinsed, and finished using the above systems and methods, and are ready to use, which significantly reduces labor and time compared to the conventional cleaning process. For example, these systems and methods can eliminate about 80% or more of the post-processing labor and time after the objects are printed and cooled. In addition to reducing labor and processing time, the automated processing of the objects performed by the various systems and methods described above also reduces exposure to the powder, glass beads, pressurized air, etc. Thus, the above systems and methods automate and accelerate the post-processing of the printed objects that significantly reduce the post-processing labor and time and enhance the finish of the objects.

The teachings of the present disclosure are not limited to 3D printing and can be useful in other applications. Non-limiting examples of other applications include mining, molding, precious stone processing, material sorting, semiconductor manufacturing, and so on. The systems and methods of the present disclosure can be used in a wide variety of applications because the systems and methods are scalable. For example, the dimensions of the basket, the size and shape of the mesh that constitutes the wall of the basket, the torque of the motor, and so on can be varied to suit any application in which the systems are used.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or controller may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing.

The term code, as used above, may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a vertical frame portion;
a horizontal frame portion connected to the vertical frame portion;
a motor connected to the vertical frame portion above the horizontal frame portion and including a shaft extending outwardly from the vertical frame portion;

a container having first and second end surfaces, a meshed wall surface extending between the first and second end surfaces, and a lid located on one of the meshed wall surface, the first end surface, and the second end surface;
wherein at least one of the first and second end surfaces is removably connected to the shaft of the motor;
wherein the motor rotates the container relative to the vertical frame portion and the horizontal frame portion; and
wherein the horizontal frame portion includes a tubular portion including a slit and first and second panels sloping towards the slit to direct material falling from the meshed wall surface of the container towards the slit; and
wherein the first and second panels are attached to the tubular portion along a length of the tubular portion and extend upwards and outwardly from the tubular portion from either side of the slit, respectively.

2. The system of claim 1 wherein a length of the slit is greater than or equal to a length of the container.

3. The system of claim 1 wherein the container includes a 3D-printed container.

4. The system of claim 1 wherein the container is cylindrical.

5. The system of claim 1 wherein the container contains an object printed on a 3D printer with powder from a powder bed of the 3D printer attached to the object.

6. The system of claim 1 wherein a distance between upper ends of the first and second panels is greater than a perimeter of the container.

7. The system of claim 1 wherein the tubular portion is closed at a first end that is proximate to the vertical frame portion and open at a second end that is opposite to the first end.

8. The system of claim 1 further comprising a suction system connected to the tubular portion.

9. The system of claim 1 further comprising a controller configured to control the motor.

10. The system of claim 1 further comprising a power supply to supply power to the motor.

11. The system of claim 7 further comprising a suction system connected to the second end of the tubular portion.

12. The system of claim 9 further comprising a power supply to supply power to the motor and the controller.

13. The system of claim 1 comprising a controller configured to:
initially oscillate the container; and
subsequently rotate the container.

14. The system of claim 1 wherein the container includes a plurality of baffles extending radially inward from the meshed wall surface.

15. The system of claim 1 wherein first ends of the first and second panels are attached to the vertical frame portion, the system further comprising a plate attached to the tubular portion and to second ends of the first and second panels.

16. The system of claim 1 wherein the first and second panels are rectangular.

17. The system of claim 1 wherein the first and second panels are curved.

18. A processing system for processing an object printed on a 3D printer comprising the system of claim 1.

* * * * *